(12) United States Patent
Yamato et al.

(10) Patent No.: US 11,403,083 B2
(45) Date of Patent: *Aug. 2, 2022

(54) OFFLOADING SERVER AND OFFLOADING PROGRAM

(71) Applicant: Nippon Telegraph and Telephone Corporation, Tokyo (JP)

(72) Inventors: Yoji Yamato, Tokyo (JP); Hirofumi Noguchi, Tokyo (JP); Misao Kataoka, Tokyo (JP); Takuma Isoda, Tokyo (JP); Tatsuya Demizu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/289,870

(22) PCT Filed: Jun. 3, 2019

(86) PCT No.: PCT/JP2019/021933
§ 371 (c)(1),
(2) Date: Apr. 29, 2021

(87) PCT Pub. No.: WO2020/090142
PCT Pub. Date: May 7, 2020

(65) Prior Publication Data
US 2021/0405981 A1    Dec. 30, 2021

(30) Foreign Application Priority Data
Oct. 30, 2018 (JP) .............................. JP2018-203480

(51) Int. Cl.
*G06F 9/44* (2018.01)
*G06F 8/41* (2018.01)
*G06F 11/36* (2006.01)

(52) U.S. Cl.
CPC .............. *G06F 8/452* (2013.01); *G06F 8/433* (2013.01); *G06F 8/445* (2013.01); *G06F 11/3612* (2013.01); *G06F 11/3624* (2013.01)

(58) Field of Classification Search
None
See application file for complete search history.

(56) References Cited

U.S. PATENT DOCUMENTS

| | | | | |
|---|---|---|---|---|
| 5,781,777 A | * | 7/1998 | Sato ........................ | G06F 8/453 717/160 |
| 6,622,301 B1 | * | 9/2003 | Hirooka .................. | G06F 8/452 717/160 |

(Continued)

OTHER PUBLICATIONS

Tanaka et al., "Evaluation of Optimization Method for Fortran Codes with GPU Automatic Parallelization Compiler," IPSJ SIG Technical Report, 2011, 2011(9):1-6, 12 pages (with English Translation).

(Continued)

*Primary Examiner* — Qamrun Nahar
(74) *Attorney, Agent, or Firm* — Fish & Richardson P.C.

(57) ABSTRACT

An offloading server includes: a data transfer designation section configured to analyze reference relationships of variables used in loop statements in an application and designate, for data that can be transferred outside a loop, a data transfer using an explicit directive that explicitly specifies a data transfer outside the loop; a parallel processing designation section configured to identify loop statements in the application and specify a directive specifying application of parallel processing by an accelerator and perform compilation for each of the loop statements; and a parallel processing pattern creation section configured to exclude loop statements causing a compilation error from loop statements to be offloaded and create a plurality of parallel processing patterns each of which specifies whether to (Continued)

perform parallel processing for each of the loop statements not causing a compilation error.

8 Claims, 12 Drawing Sheets

(56) References Cited

U.S. PATENT DOCUMENTS

| | | | |
|---|---|---|---|
| 2011/0238957 A1* | 9/2011 | Shirota | G06F 8/4441 |
| | | | 712/241 |
| 2015/0100971 A1* | 4/2015 | Dube | G06F 9/54 |
| | | | 719/319 |
| 2015/0205643 A1* | 7/2015 | Miyamoto | G06F 9/5011 |
| | | | 718/106 |

OTHER PUBLICATIONS

Yamato et al., "Automatic GPU Offloading Technology for Open IoT Environment," IEEE Internet of Things Journal, Sep. 2018, 10 pages.

Yamato et al., "Development of Template Management Technology for Easy Deployment of Virtual Resources on OpenStack," Journal of Cloud Computing: Advances, Systems and Applications, Jun. 2014, 3:7, 12 pages.

Yamato, "Automatic verification technology of software patches for user virtual environments on IaaS cloud," Journal of Cloud Computing: Advances, Systems and Applications, Feb. 2015, 4:4, 14 pages.

* cited by examiner

OFFLOADING SERVER AND OFFLOADING PROGRAM

CROSS-REFERENCE TO RELATED APPLICATIONS

This application is a National Stage application under 35 U.S.C. § 371 of International Application No. PCT/JP2019/021933, having an International Filing Date of Jun. 3, 2019, which claims priority to Japanese Application Serial No. 2018-203480, filed on Oct. 30, 2018. The disclosure of the prior application is considered part of the disclosure of this application, and is incorporated in its entirety into this application.

TECHNICAL FIELD

The present invention relates to an offloading server and offloading program that automatically offload functional processing to an accelerator such as a Graphics Processing Unit (GPU).

BACKGROUND

Recently, Internet of Things (IoT) technologies have evolved and, as a result, applications that analyzes and visualize data collected on the device side via a network by using cloud technologies have been appearing one after another.

Most conventional Iot Services are of the silo type, in which from devices, networks, up to applications are integrated. However, in order to reduce cost and provide various services, the idea of OpenIoT, in which plural applications share devices and dynamically coordinate resources of clouds, networks, and devices to provides services, is now being paid attention.

It is expected that, using OpenIoT, surveillance cameras of multiple groups in cities will be shared and used for multiple purposes such as searching for lost children and finding terrorists. However, in this example, using the image processing of the camera images for a plurality of purposes requires enormous CPU calculation resources regardless of where the analysis is carried out either on the device side or on the cloud side.

On the other hand, in recent years, in order to support various fields such as IoT, the use of heterogeneous computing resources other than CPU is increasing. For example, it has been started to perform image processing with a server with an enhanced Graphics Processing Unit (GPU) (accelerator) and to accelerate signal processing with a Field Programmable Gate Array (FPGA) (accelerator). Amazon Web Service (AWS) (registered trademark) provides GPU instances and FPGA instances. Those resources can be used on demand. Microsoft (registered trademark) uses FPGAs to improve the efficiency of searches.

In an OpenIoT environment, various applications are expected to be created using service coordination technologies. It is expected to improve the performance of applications by utilizing further advanced hardware. For that purpose, however, programming and settings according to the hardware to be operated are required. For example, it requires much technical knowledge, examples of which include Compute Unified Device Architecture (CUDA) and Open Computing Language (OpenCL), and thus imposes a high hurdle.

The following is required to utilize a GPU or FPGA in a user IoT application easily. That is, it is desired that, in the event of deploying to an OpenIoT environment a general purpose application to be operated, such as image processing or cryptographic processing applications, an OpenIoT platform analyze the application logic and automatically offload the processing thereof to a GPU and/or FPGA.

(Tacit Computing)

Toward the platform for OpenIoT, Tacit Computing is proposed as a mechanism to allow a service to freely utilize devices (see Non-Patent Literature 1). Tacit Computing is a technology that enables a user to discover and utilize a device on demand that holds necessary data, on the basis of live data held by devices at that time.

FIG. 11 is a diagram for explaining the idea of Tacit Computing.

Tacit Computing finds appropriate resources for the service to a user from three layers composed of a cloud layer 2, a network layer 3, and a device layer 4 and coordinates them to respond to a request from the user and to carry on the service (reference sign a in FIG. 11). Data centers (DC) 30 are deployed on the cloud layer 2; network edges 20, on the network layer 3; and gateways 10, on the device layer 4. Tacit Computing attempts to carry out processing as at the device layer as possible, which is the nearest to the place where data is generated in the three layers, to deal with the situation that changes moment by moment (reference sign b in FIG. 11). Carrying out the processing at a lower layer contributes to reduction of the network traffic (reference sign c in FIG. 11) and to restraining leakage of data with high privacy sensitivity (reference sign d in FIG. 11).

Tacit Computing uses, as its elemental technologies, live data search technique and device virtualization technique.

The live data search technique is a technique for searching for a device that provides data necessary for a user. An example of IoT services is to arrange plural sensors on a facility like a bridge and monitor deterioration status or the like of the facility. In this case, as it is unlikely that the deterioration will rapidly progress, sensor data at a plurality of points may be sent to the cloud at intervals of, for example, several hours and changes in the deterioration status may be analyzed by statistical software or machine learning. In contrast, in a service that provides information guidance and warning alerts with regard to a person captured by a fixed camera, the person will be captured by the camera only for about a few seconds and it can be said that only the video in which the person has been captured is meaningful to that person. Such data that is generated in the device layer and changes moment by moment is called live data.

To search for this live data necessary for the user, Tacit Computing deploys the analysis function at a lower layer and causes the lower layer to search for the live data rather than waiting for the live data to come up to the cloud layer.

For example, assume that a friend of yours is participating in a preliminary race of an ekiden and you desire that videos in which the friend is captured be automatically concatenated. In this case, when you makes a request with the race bib number of the friend being the search key, Tacit computing deploys an image analysis function, such as Open Source Computer Vision Library (OpenCV), to a gateway and/or a network edge which is provided with a camera. By analyzing the video at a place near the camera, the race bib number of the friend is extracted by image analysis and the camera capturing the friend can be identified. Tacit Computing uses the live data search technique in this way.

Next, when the device to be utilized has been identified using the live data search technique, the device needs to be actually utilized. Many makers are developing IoT devices. The protocol, interface, address, and the like at the time of utilization are different on different devices. The device virtualization technique is used to absorb the differences in the interfaces of the devices.

For example, in the above-described example, on the basis of common requests such as a request for taking video by a camera, an adapter for protocol conversion or the like is provided for each device on a gateway or the like that takes charge of the camera. The adapter issues requests in a manner adapted to the camera. Using such a device virtualization technique, users can use devices without being conscious of the differences between the devices.

(Offloading to GPU)

Development environment CUDA, which is for General Purpose GPU (GPGPU) utilizing the computation power of a GPU for a purpose other than image processing, has been evolving. CUDA is a development environment for GPGPU. In addition, OpenCL has appeared as a standard for handling heterogeneous hardware such as GPUs, FPGAs, and many-core CPUs.

Development under CUDA and OpenCL involves programming with an extension of C language. It requires describing memory-to-memory copy/release operations between a CPU and devices like GPUs. Such description requires high skill. In fact, there are not so many engineers who can make full use of CUDA and/or OpenCL.

There is known a technique in which, for the purpose of using a GPGPU easily, a range of statements to be subjected to parallel processing, such as loop statements, is designated in a directive-based language and a compiler compiles the statements into device-specific code in accordance with the directives. Examples of the technical specification of such a technique include Open Accelerator (OpenACC) and examples of such a compiler include PGI compiler (registered trademark). In an example using OpenACC, a user designates, in a code written in C/C++/Fortran language, parallel processing or the like using OpenACC directives. PGI compiler checks whether the code is parallelizable and generates an executable binary for a GPU and an executable binary for a CPU and convert them into an executable module. IBM JDK (registered trademark) supports a function of offloading designation of parallel processing in accordance with the lambda format of Java (registered trademark) to a GPU. Using these techniques, programmers need not be conscious of, for example, data allocation to GPU memory.

In this way, with the techniques of OpenCL, CUDA, and OpenACC and the like, offloading to GPUs has been made possible.

PRIOR ART DOCUMENT

Non-Patent Literature

Non-Patent Literature 1: Y. Yamato, T. Demizu, H. Noguchi and M. Kataoka, "Automatic GPU Offloading Technology for Open IoT Environment," IEEE Internet of Things Journal, DOI: 10.1109/JIOT.2018.2872545, September 2018.

Non-Patent Literature 2: Y. Tanaka, M. Yoshimi, M. Miki and T. Hiroyasu, "Evaluation of Optimization Method for Fortran Codes with GPU Automatic Parallelization Compiler," IPSJ SIG Technical Report, 2011(9), pp. 1-6, 2011.

Non-Patent Literature 3: Y. Yamato, M. Muroi, K. Tanaka and M. Uchimura, "Development of Template Management Technology for Easy Deployment of Virtual Resources on OpenStack," Journal of Cloud Computing, Springer, 2014, 3:7, DOI: 10.1196/s13677-014-0007-3, June 2014.

Non-Patent Literature 4: Y. Yamato, "Automatic verification technology of software patches for user virtual environments on IaaS cloud," Journal of Cloud Computing, Springer, 2015, 4:4, DOI: 10.1196/s13677-015-0028-6, February 2015.

SUMMARY OF THE INVENTION

Problems to be Solved by the Invention

Offloading to GPUs has been made possible using the above-described techniques of OpenCL, CUDA, OpenACC and the like.

However, even if the offloading itself has been made available, there are many considerations to perform appropriate offloading. For example, there exists a compiler having an automatic parallelization function, examples of which includes Intel compiler (registered trademark). Automatic parallelization involves extracting a parallel processing part, e.g., a for statement (repeat statement) or the like, of the program. However, in the event of actual parallel processing using a GPU, good performance is not often obtained due to the overhead of CPU-GPU memory-to-memory data exchange. In the event of acceleration using a GPU, it is required that a skilled person perform tuning with OpenCL and/or CUDA and/or find appropriate parallel processing part using PGI compiler or the like. There is an example (see Non-Patent Literature 2) which performs a performance measurement on a benchmark application with few for statements by performing brute-force testing on the for statements as to whether to apply parallel processing to each for statement, thereby to find the most appropriate parallel processing part.

As will be appreciated from the above, it is difficult for an unskilled user to improve the performance of an application by using a GPU. Even when using an automatic parallelization technique, it requires, for example, to determine as to whether to parallelize a for statement by trial-and-error tuning, and thus it takes a long time to start utilization of the GPU.

The technique disclosed in Patent Literature 1 focuses on automatic extraction of application's appropriate parallel processing part. There are not so many applications that can be accelerated using this technique.

According to Patent Literature 1, a genetic algorithm is used to automatically tune the parallel processing part which is effectively performed by GPU processing. However, there has been applications that cannot be improved in performance in a manner depending on data transfers between CPU and GPU memories.

For this reason, it is difficult for an unskilled user to improve the performance of an application using GPU. In addition, even when using an automatic parallelization technique, try-and-error operations are necessary to determine whether parallel processing can be performed, and there are cases in which acceleration is not possible.

The present invention has been made in view of the above circumstances, and it is an object of the present invention to provide an offloading server and offloading program that are capable of, while reducing the number of data transfers between a CPU and a GPU, improving the overall processing capability of an application by automatically offloading specific processing of the application to an accelerator.

Solution to Problem

To achieve the above-described improvement, a first aspect of the invention is an offloading server configured to offload specific processing of an application to an accelerator. The offloading server includes: an application code analysis section configured to analyze a source code of an application; a data transfer designation section configured to analyze reference relationships of variables used in loop statements in the application and to make, for data that can be transferred outside a loop, data transfer designation using an explicit directive that explicitly specifies a data transfer outside the loop; a parallel processing designation section configured to identify the loop statements in the application and, for each of the loop statements, specify a directive specifying application of parallel processing by the accelerator and perform compilation; a parallel processing pattern creation section configured to exclude loop statements causing a compilation error from loop statements to be offloaded and create a plurality of parallel processing patterns each of which specifies whether to perform parallel processing for each of the loop statements not causing a compilation error; a performance measurement section configured to, for each of the plurality of parallel processing patterns, compile the application according to the parallel processing pattern, deploy the compiled application to an accelerator verification machine, and perform processing for a measurement of a performance of the application when offloaded to the accelerator; and an executable file creation section configured to select a parallel processing pattern with a highest processing performance as a solution from the plurality of parallel processing patterns on the basis of a result of the measurement of the performance, and compile the application according to the parallel processing pattern with the highest processing performance to create an executable file.

With this configuration, it is possible to, while reducing the number of data transfers between a CPU and an accelerator, automatically offload specific processing of the application to the accelerator and to, as a result, increase the overall processing capability. With this configuration, even a user not having the skill of using CUDA or the like can perform high performance processing using an accelerator. In addition, it is possible to improve the performance of general-purpose applications for which performance improvement using an accelerator has not been considered. In addition, offloading to an accelerator of a general-purpose machine, which is not a high-performance server for calculation, is possible.

A second aspect of the invention is the offloading server according to the first aspect, wherein the data transfer designation section is further configured to perform data transfer designations using: an explicit directive that explicitly specifies a CPU-to-accelerator data transfer, and an explicit directive that explicitly specifies an accelerator-to-CPU data transfer.

With this configuration, data transfer designations using explicit directives are performed, for example, in combination with the extraction of parallel processing using Genetic Algorithm (GA). This makes it possible to reduce the number of CPU-to-accelerator data transfers and the number of accelerator-to-CPU data transfers.

A third aspect of the invention is the offloading server according to the first aspect or second aspect, wherein the data transfer designation section is further configured to, when a first variable defined on a CPU program side is to be referenced by an accelerator program side, specify a CPU-to-accelerator data transfer immediately before a first loop to be processed by the accelerator or immediately before a loop which is the outermost loop of nested loops including the first loop and an outer loop of the first loop and including neither setting nor definition of the first variable, and wherein the data transfer designation section is further configured to, when a second variable set on the accelerator program side is to be referenced by the CPU program side, specify an accelerator-to-CPU data transfer immediately before a second loop to be processed by the accelerator or immediately before a loop which is the outermost loop of nested loops including the second loop and an outer loop of the second loop and including neither reference, setting, nor definition of the second variable except in the second loop.

With this, data transfer is explicitly specified so as to be performed in a batch manner at a loop located as outer as possible, thereby to avoid ineffective data transfer such that data is transferred at every loop iteration.

A fourth aspect of the invention is the offloading server according to the third aspect, wherein the data transfer designation section is configured to, when a CPU-to-accelerator transfer and an accelerator-to-CPU transfer are both to be performed on the same variable, specify a data transfer using an explicit directive that explicitly specifies data transfers in the both directions.

In this way, when a CPU-to-accelerator transfer and an accelerator-to-CPU transfer are both to be performed on the same variable, they are collectively specified as data copies in the both directions, thereby to further effectively avoid ineffective data transfer such that data is transferred at every loop iteration.

A fifth aspect of the invention is the offloading server according to the first aspect of the invention and further includes: a storage section having a test case database storing performance test items; and a performance measurement test extraction section configured to, after the executable file has been deployed to an in-service environment, extract performance test items from the test case database and conduct a performance test.

With this configuration, performance testing of the automatic offloading is carried out with the performance test items.

A sixth aspect of the invention is the offloading server according to the first aspect of the invention. The parallel processing designation section includes: an offload area extraction section configured to identify processing offloadable to the accelerator and extract an intermediate language according to offload processing; and an intermediate language file output section configured to output an intermediate language file. The performance measurement section is further configured to: deploy an executable file derived from an intermediate language to the accelerator verification machine, cause the accelerator verification machine to execute the deployed binary file and to perform a measurement of a performance of the deployed binary file when offloaded, and acquire a result of the measurement of the performance of the deployed binary file and return the result to the offload area extraction section. The offload area extraction section is further configured to extract another parallel processing pattern. The intermediate language file output section is further configured to carry out a performance measurement for trial using an extracted intermediate language. The executable file creation section is further configured to select a parallel processing pattern with a highest processing performance from the plurality of parallel processing patterns created by the parallel processing pattern creation section and the another parallel processing pattern extracted by the offload area extraction section, on the basis of the result of the performance measurement repeated for a predetermined number of times and compile the application according to the parallel processing pattern with the highest processing performance to create the executable file.

With this configuration, an intermediate language according to the offloading processing is extracted and an intermediate language file is outputted. Then, the executable file derived from the intermediate language is deployed. In addition, extraction of the intermediate languages and deployment of the executable files are repeated to find appropriate offload areas. With this, it is possible to automatically extract appropriate offload areas from a general-purpose program that does not assume parallelization.

A seventh aspect of the invention is the offloading server according to the first aspect of the invention. The parallel processing designation section is further configured to regard, in accordance with a genetic algorithm, a number of the loop statements not causing a compilation error as a gene length. The parallel processing pattern creation section is further configured to prepare gene patterns for current-generation individuals whose number is specified, wherein each of the gene patterns has elements whose value is randomly assigned a value of 1 or 0 and application/non-application of accelerator processing is mapped to the value in such a way that performing accelerator processing is assigned either 1 or 0 and not performing acceleration processing is assigned either the opposite 0 or 1. The performance measurement section is further configured to perform a performance measurement process including: for each of the current-generation individuals, compiling an application code in which directives specifying application of parallel processing by the accelerator are described, deploying the compiled code to the accelerator verification machine, and performing processing for the measurement of the performance of the individual on the accelerator verification machine. The performance measurement section is further configured to perform a recombination process including: after the measurement of the performance has been completed for all the current-generation individuals, evaluating the current-generation individuals in such a manner that an individual that requires less processing time period is regarded as having a higher degree of adaptability, selecting one or more individuals each having a degree of adaptability higher than a predetermined value from all the individuals as individuals with high performances, and creating a specified number of next-generation individuals by performing crossover and mutation processes on the selected one or more individuals. The performance measurement section is further configured to repeat the recombination process and the performance measurement process for a specified number of generations using the next-generation individuals as the current-generation individuals. The executable file creation section is further configured to, after the recombination process and the performance measurement process have been completed for the specified number of generations, select a parallel processing pattern corresponding to an individual with a highest performance as the solution.

With this configuration, the offloading server first checks if the loop statements can be parallelized and then, for a set of repeat statements that can be parallelized, repeatedly performs a performance verification trial on a verification environment using GA to find appropriate areas. By narrowing down to the loop statements (e.g., for statements) that can be parallelized and holding and recombining a parallel processing pattern that may possibly achieve acceleration in a form of a part of gene, a pattern that achieves acceleration can be efficiently found from an enormous number of parallel processing patterns that can be made.

An eighth aspect of the invention is a non-transitory computer-readable medium storing an offloading program configured to cause a computer to function as the offloading server according to the first aspect.

With this configuration, it is possible to cause a general computer to achieve the function of the offloading server according to the first aspect.

Advantageous Effects of the Invention

According to the present invention, it is possible to provide an offloading server and offloading program that are capable of, while reducing the number of data transfers between a CPU and an accelerator, improving the overall processing capability of an application by automatically offloading specific processing of the application to an accelerator.

MODES FOR CARRYING OUT THE INVENTION

Next, a description will be given of an offloading server 1 and others in a mode for carrying out the present invention (hereinafter referred to as "the present embodiment").

As used herein, the term "CPU-to-GPU data transfer" means a transfer of data from a CPU to a GPU.

As used herein, the term "GPU-to-CPU data transfer" means a transfer of data from a GPU to a CPU.

As used herein, the term "CPU-to-GPU-to-CPU data transfer" means a transfer of data from a GPU to a CPU and a transfer of the same data from the GPU to the CPU.

As used herein, the term "CPU-to-accelerator data transfer" means a transfer of data from a CPU to an accelerator.

As used herein, the term "accelerator-to-CPU data transfer" means a transfer of data from an accelerator to a CPU.

Figure 1:
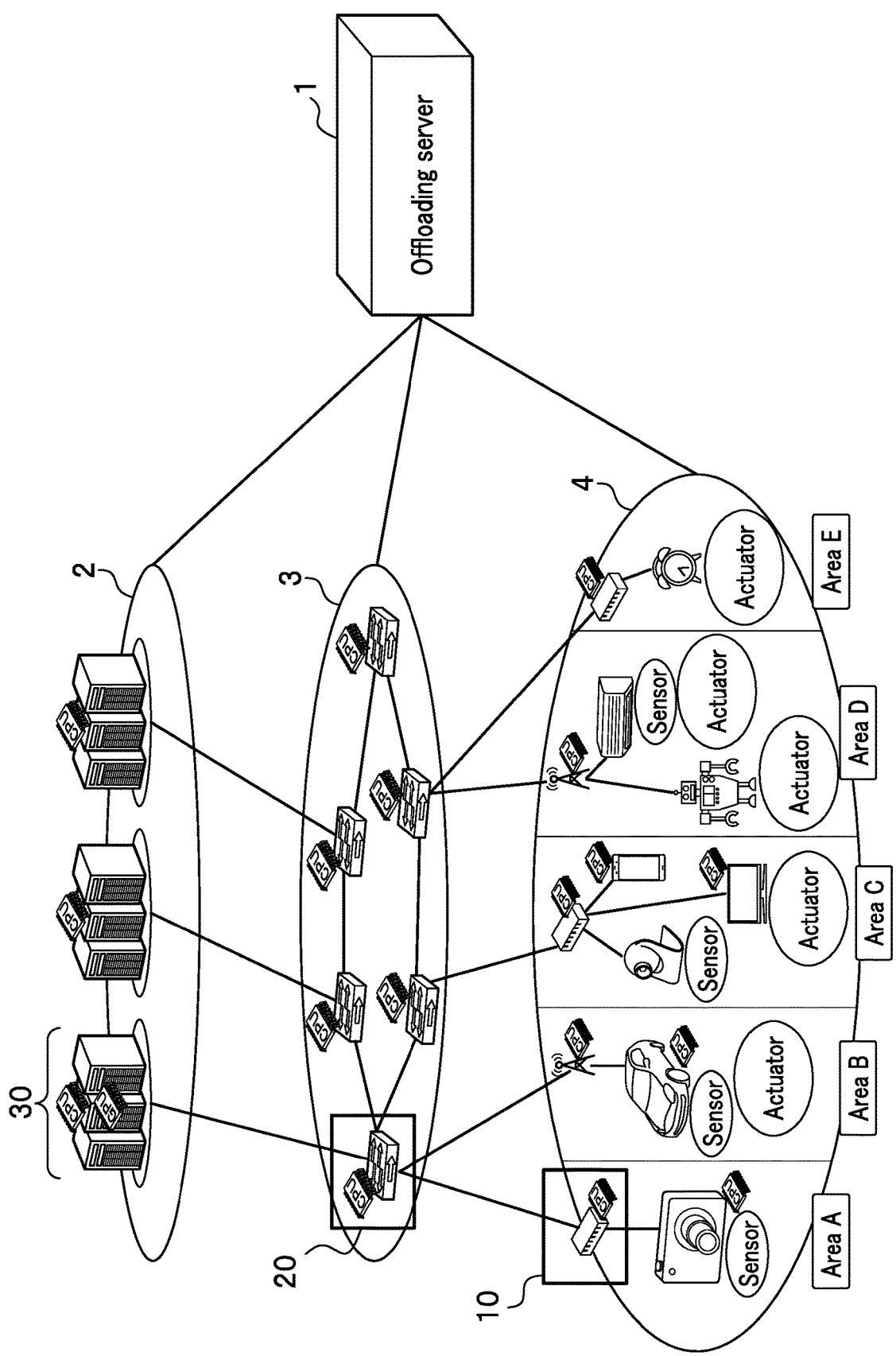
FIG. 1 is a diagram illustrating a Tacit Computing system including an offloading server according to an embodiment of the present invention.

FIG. 1 is a diagram illustrating a Tacit Computing system including an offloading server 1 according to the present embodiment.

Figure 11:
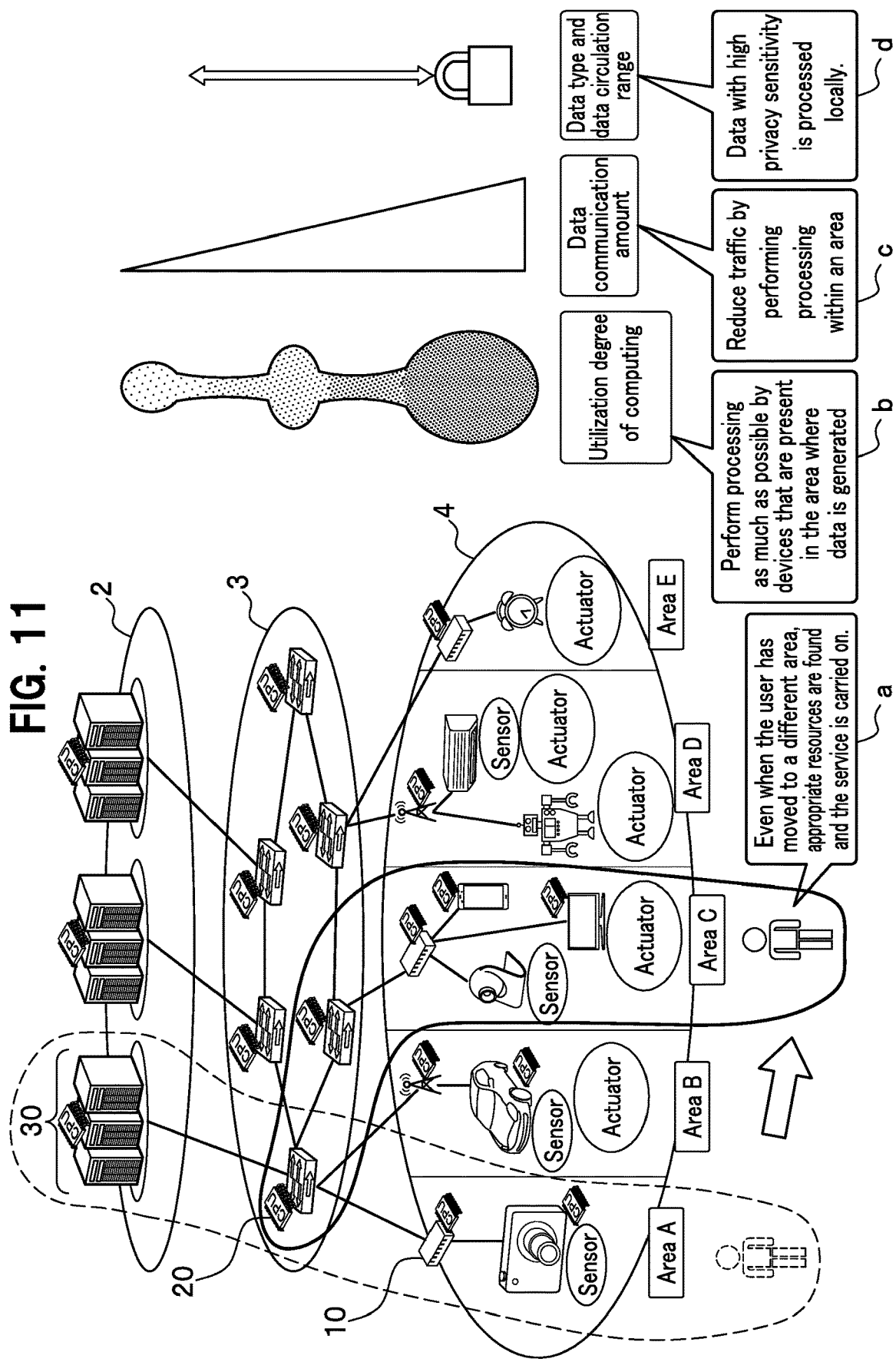
FIG. 11 is a diagram for explaining an overview of Tacit Computing.

The Tacit Computing system according to the present embodiment is characterized in including the offloading server 1 in addition to the conventional configuration of Tacit Computing illustrated in FIG. 11. The offloading server 1 is an offloading server that offloads specific processing of an application to an accelerator. The offloading server 1 is connected in a communicable manner with devices located in the three layers composed of the cloud layer 2, network layer 3, and device layer 4. Data centers 30 are deployed on the cloud layer 2; network edges 20, on the network layer 3; and gateways 10, on the device layer 4.

In the conventional Tacit Computing system as illustrated in FIG. 11, in the event of finding and utilizing a device in an ad-hoc manner, as it is premised that in the first place the service is able to be provided, the cost and performance are not considered. However, in order for the service to be provided continuously and reasonably, it is necessary to reduce the operational cost by performance improvement, for example.

Tacit Computing has partially achieved the OpenIoT concept of finding and utilizing a device suitable to a user. However, in the event of utilizing and coordinating devices extemporaneously by Tacit Computing, costs and the like are left out of consideration. For example, if the above-described example is to be applied to monitoring a terrorist or watching an elderly person using cameras in a city rather than to monitoring runners participating in a marathon event, the service of performing image analysis on the videos captured by the cameras need to be provided continuously and reasonably.

The Tacit Computing system including the offloading server 1 according to the present embodiment improves the efficiency of the system by appropriately performing function allocation and offloading on each of the device layer, network layer, and cloud layer. The improvement of the efficiency is mainly achieved by allocating each function to an appropriate layer of the three layers to efficiently perform processing and by offloading functional processing such as image analysis to heterogeneous hardware such as a GPU and FPGA. In the cloud layer, there are an increasing number of servers provided with heterogeneous hardware (hereinafter referred to as heterogeneous device(s)) such as a GPU and FPGA. For example, Bing search of Microsoft (registered trademark) uses FPGAs. Performance improvement can be achieved utilizing heterogenous devices, for example, by offloading matrix calculations to a GPU or by offloading specific processing such as Fast Fourier Transformation (FFT) to an FPGA.

Hereinbelow, a description will be given of a configuration example of the offloading server 1 according to the present embodiment, which performs offloading in the background of a service use targeted for users in a Tacit Computing system.

As discussed above, a Tacit Computing system provides services in an ad-hoc manner by utilizing appropriate devices in response to requests from users. For example, Non-Patent Literature 1 describes a watching service that, by performing image analysis and using network cameras installed in a city, monitors a target person continuously by switching the network cameras. In such a case, it is conceivable to provide the service as a trial on the first day and perform an offloading process of image analysis in the background of the service and, on the succeeding days, provide the watching service with a reasonable price by offloading the image analysis to a GPU.

Figure 2:
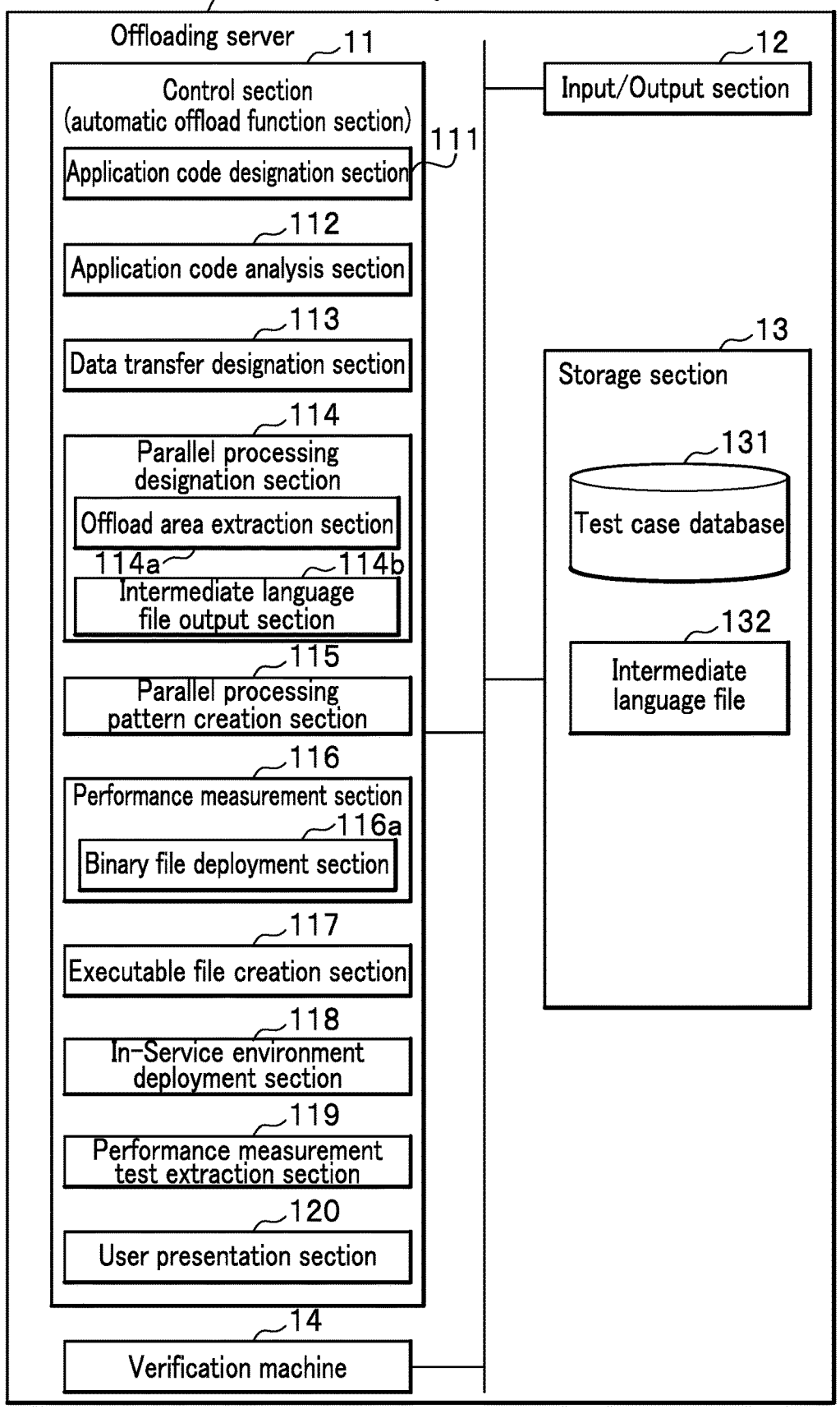
FIG. 2 is a functional block diagram illustrating a configuration example of the offloading server according to the embodiment.

FIG. 2 is a functional block diagram illustrating a configuration example of the offloading server 1 according to the embodiment.

The offloading server 1 is a device that automatically offloads specific processing of an application to an accelerator.

As illustrated in FIG. 2, the offloading server 1 includes a control section 11, input/output section 12, storage section 13, and verification machine 14 (accelerator verification machine).

The input/output section 12 is composed of a communication interface for transmitting/receiving information to/from devices belonging to the cloud layer, network layer, or device layer; input devices such as a touch panel and keyboard; and input/output interface for transmitting/receiving information to/from an output device such as a monitor.

The storage section 13 is composed of a hard disk(s), flash memory(ies), Random Access Memory(ies) (RAM(s)) and the like.

The storage section 13 is used to store test case database 131, a program (offloading program) for causing the control section 11 to perform its functions, and information necessary for the control section 11 to perform its processing (e.g., intermediate language files (intermediate files) 132).

The test case database 131 stores performance test items. The test case database 131 stores data corresponding to the performance test items, examples of which include a price (e.g., information on the charge of an IoT service) and performance (computation resource of an accelerator).

The verification machine 14 is equipped with a GPU(s) and an FPGA(s) (accelerator(s)) as a verification environment of Tacit Computing.

The control section 11 is an automatic offload function section that controls the overall system of the offloading server 1. The control section 11 is instantiated by a not-shown Central Processing Unit (CPU) loading a program (offloading program) stored in the storage section 13 into a RAM and executing it.

The control section 11 includes: an application code designation section 111 (configured to designate application code), an application code analysis section 112 (configured to analyze application code), a data transfer designation section 113, a parallel processing designation section 114, a parallel processing pattern creation section 115, a performance measurement section 116, an executable file creation section 117, an in-service environment deployment section 118 (configured to deploy binary files to an in-service environment), a performance measurement test extraction section 119 (configured to extract performance test cases and running the test cases automatically), and a user presentation section 120 (configured to provide information indicative of a price and performance to a user for judgement).

<Application Code Designation Section 111>

The application code designation section 111 performs designation on the inputted application code. Specifically, the application code designation section 111 identifies processing function (image analysis or the like) of the service to be provided to users.

<Application Code Analysis Section 112>

The application code analysis section 112 analyzes the source code of the processing function to understand the structure thereof including loop statements, calls to an FFT library, and the like.

<Data Transfer Designation Section 113>

The data transfer designation section 113 is configured to analyze reference relationships of variables used in loop statements and designate, for data that can be transferred outside a loop, a data transfer using an explicit directive (#pragma acc data copyin/copyout/copy(a[ . . . ]), where a is a variable) that explicitly specifies a data transfer outside the loop.

The directives used by the data transfer designation section 113 to designate data transfers includes: an explicit directive (#pragma acc data copyin(a[ . . . ])) that explicitly specifies a data transfer from a CPU to a GPU, an explicit directive (#pragma acc data copyout(a[ . . . ])) that explicitly specifies a data transfer from a GPU to a CPU, and an explicit directive (#pragma acc data copy(a[ . . . ])) that explicitly specifies, when a CPU-to-GPU transfer and a GPU-to-CPU transfer are both to be performed on the same variable, those data copies in the both directions together.

When a variable defined on the CPU program side is to be referenced by the GPU program side, the data transfer designation section 113 specifies a CPU-to-GPU data transfer at an outermost loop in which neither setting nor definition of the variable is included, among the loop of the loop statement to be processed by the GPU and the outer loops thereof. When a variable set on the GPU program side is to be referenced by the CPU program side, the data transfer designation section 113 specifies a GPU-to-CPU data transfer at an outermost loop in which neither reference, setting, nor definition of the variable is included, among the loop of the loop statement to be processed by the GPU and the outer loops thereof.

<Parallel Processing Designation Section 114>

The parallel processing designation section 114 identifies loop statements (repeat statements) of the application and, for each of the loop statements, specifies a directive specifying application of parallel processing by an accelerator and performs compilation.

The parallel processing designation section 114 includes: an offload area extraction section 114a (configured to extract offloadable area), and an intermediate language file output section 114b (configured to output intermediate files).

The offload area extraction section 114a identifies processing offloadable to a GPU or FPGA, examples of which processing include loop statements and FFT processing, and extracts an intermediate language according to the offload processing.

The intermediate language file output section 114b outputs the extracted intermediate language file 132. To find appropriate offload areas, extraction of intermediate language is not finished by one time but is performed repeatedly to perform actual offloading for trial for optimization.

<Parallel Processing Pattern Creation Section 115>

The parallel processing pattern creation section 115 excludes loop statements (repeat statements) at which a compilation errors occurs from those to be offloaded and creates a plurality of parallel processing patterns each of which specifies whether to perform parallel processing for each of the repeat statements not causing a compilation error.

<Performance Measurement Section 116>

The performance measurement section 116 compiles, for each of the plurality of parallel processing patterns, the application according to the parallel processing pattern, deploys the application to the verification machine 14, and executes processing for measuring the performance in the event of offloading to the accelerator.

The performance measurement section 116 includes a binary file deployment section 116a (configured to deploy binary files). The binary file deployment section 116a deploys an executable file (binary file) derived from an intermediate language to the verification machine 14 equipped with a GPU(s) and/or an FPGA(s).

The performance measurement section 116 executes, for each of the plurality of parallel processing patterns, the deployed binary file to measure the performance obtained when offloading is performed and returns the result of the performance measurement to the offload area extraction section 114a. Then, the offload area extraction section 114a performs extraction of another parallel processing pattern. Then, the intermediate language file output section 114b performs performance measurements for trial using the extracted intermediate language (see reference sign e in FIG. 3, which is described later).

<Executable File Creation Section 117>

The executable file creation section 117 selects a parallel processing pattern with a highest processing performance from the plurality of parallel processing patterns created by the parallel processing pattern creation section 115 and the another parallel processing pattern extracted by the offload area extraction section 114a, on the basis of the result of the performance measurement repeated for a predetermined number of times and uses the parallel processing pattern with the highest processing performance to create an executable file.

<In-Service Environment Deployment Section 118>

The in-service environment deployment section 118 deploys the created executable file to the in-service environment for users (deploys the final version of the binary file to the in-service environment). The in-service environment deployment section 118 determines a pattern indicative of the final offload areas and deploys the executable file corresponding to the pattern to the in-service environment.

<Performance Measurement Test Extraction Section 119>

After the executable file has been deployed, the performance measurement test extraction section 119 extracts performance test items from the test case database 131 and conducts a performance test (deploys the final binary file to the in-service environment).

After the executable file has been deployed, to present the performance to the user, the performance measurement test extraction section 119 extracts performance test items from the test case database 131 and performs an automatic execution of the extracted performance tests.

<User Presentation Section 120>

The user presentation section 120 presents information about the price and performance and the like based on the result of the performance test to the user (presents information about the price and performance and the like). The test case database 131 stores data representing prices and performances corresponding to the performance test items. The user presentation section 120 reads the data representing the prices and performances corresponding to the test items stored in the test case database 131 and presents them together with the result of the performance tests. The user judges whether to subscribe to the IoT service with billing in reference to the presented information about the prices, performance, and the like. For batch deployment to the in-service environment, the existing technique described in Non-Patent Literature 3 may be used; and for automatic performance testing, the existing technique described in Non-Patent Literature 4 may be used.

[Application of Genetic Algorithm]

The offloading server 1 may be configured to use GA to optimize offloading. The configuration of the offloading server 1 when using GA is as follows.

The parallel processing designation section 114 regards the number of loop statements (repeat statements) not causing a compilation error as the gene length, in accordance with the genetic algorithm. The parallel processing pattern creation section 115 maps application/non-application of acceleration processing to a gene pattern in such a way that application of accelerator processing is assigned either 1 or 0 and non-application of accelerator processing is assigned either the opposite 0 or 1.

The parallel processing pattern creation section 115 prepares gene patterns whose gene values are randomly set as either 1 or 0 for a specified number of individuals. The performance measurement section 116, according to each individual, compiles an application code in which directives specifying application of parallel processing by an accelerator are described and deploys the compiled code to the verification machine 14. The performance measurement section 116 executes processing for measuring the performance, on the verification machine 14.

When an individual of an intermediate generation has a gene representing a parallel processing pattern which is the same as that of an individual of an earlier generation, the performance measurement section 116 does not perform compilation of the application code with the same processing pattern and does not perform performance measurement and uses the same performance measurement value as that of the individual of the earlier generation.

For an application code causing a compilation error and an application code with which the performance measurement does not finish within a predetermined time period, the performance measurement section 116 regards these cases as causing a timeout and sets the performance measurement value to a predetermined period of time (a long period of time).

The performance measurement section 116 performs the performance measurement for all the individuals and evaluates them in such a manner that an individual with a shorter processing time is regarded as having a higher adaptability. The performance measurement section 116 selects from all the individuals an individual having a degree of adaptability higher than a predetermined value (e.g., top n percent of all the individual or top m individuals, where n and m are natural numbers) as an individual with high performance and performs crossover and mutation processes to the selected individual to create an individual of a next generation. After processing for a specified number of generations has been completed, the executable file creation section 117 selects a parallel processing pattern with the highest performance as the solution.

Hereinbelow, a description will be given of an automatic offload operation of the offloading server 1 configured as described above.

[Automatic Offload Operation]

The offloading server 1 of the present embodiment is, as an elemental technology of Tacit Computing, an example of application to a technique of automatically offloading user application logic to a GPU.

Figure 3:
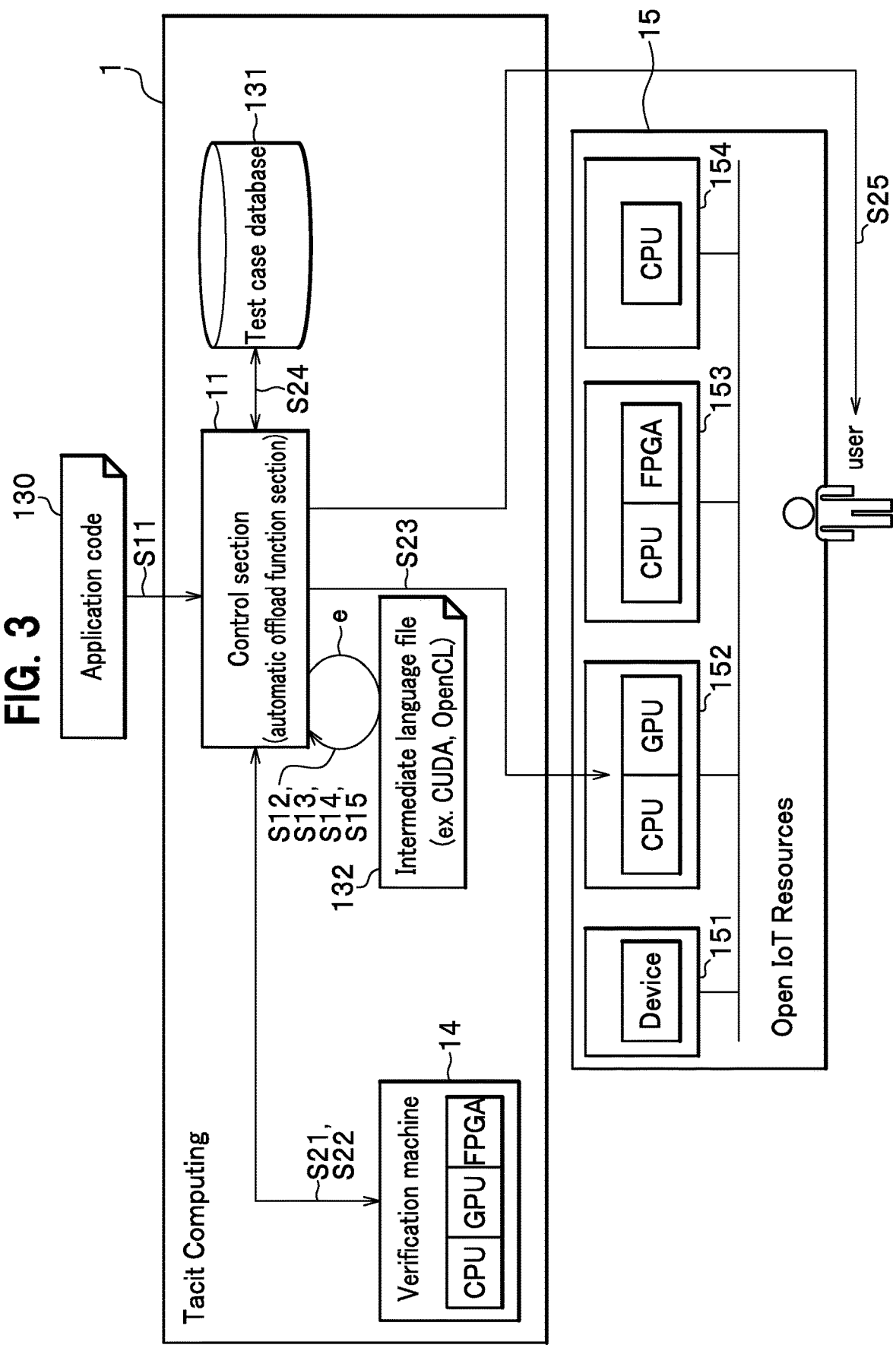
FIG. 3 is a diagram illustrating an automatic offloading process using GA of the offloading server according to the embodiment.

FIG. 3 is a diagram illustrating the automatic offloading process using the GA of the offloading server 1.

As illustrated in FIG. 3, the offloading server 1 is applied to an elementally technology of Tacit Computing. The offloading server 1 includes a control section (automatic offload function section) 11, a test case database 131, and an intermediate language file 132, and a verification machine 14.

The offloading server 1 retrieves an application code 130 to be used by a user.

The user uses OpenIoT resources 15. Examples of OpenIoT resources 15 includes a device 151, a CPU-GPU device 152, a CPU-FPGA device 153, and a CPU device 154. The offloading server 1 automatically offloads functional processing to the accelerators of the CPU-GPU device 152 and CPU-FPGA device 153.

Hereinbelow, a description will be given of the constituent elements with reference to the process step numbers illustrated in FIG. 3.

<Step S11: Specify Application Code>

At step S11, the application code designation section 111 (see FIG. 2) identifies the processing function (e.g., image analysis) to be provided to the user. Specifically, the application code designation section 111 designates the application code that is inputted.

<Step S12: Analyze Application Code>

At step S12, the application code analysis section 112 (see FIG. 2) analyzes the source code of the processing function to understand the structure thereof including loop statements and calls to an FFT library.

<Step S13: Extract Offloadable Area>

At step S13, the parallel processing designation section 114 (see FIG. 2) identifies loop statements (repeat statements) of the application and, for each of the repeat statements, specifies a directive specifying application of parallel processing by an accelerator and performs compilation to check whether the specified directive causes a compilation error. Specifically, the offload area extraction section 114a (see FIG. 2) identifies processing offloadable to GPU and/or FPGA, such as loop statements and FFT processing, and extracts an intermediate language according to the offload processing.

<Step S14: Output Intermediate File>

At step S14, the intermediate language file output section 114b (see FIG. 2) outputs an intermediate language file 132. To find appropriate offload areas, extraction of intermediate language is not finished by one time but is performed repeatedly to perform actual execution for trial for optimization.

<Step S15: Create Parallel Processing Patterns>

At Step S15, the parallel processing pattern creation section 115 (see FIG. 2) excludes loop statements causing a compilation error from those to be offloaded and creates a plurality of parallel processing patterns each of which specifies whether to perform parallel processing for each of the loop statements not causing a compilation error.

<Step S21: Deploy Binary File>

At step S21, the binary file deployment section 116a (see FIG. 2) deploys an executable file derived from an intermediate language corresponding to a parallel processing pattern to the verification machine 14 equipped with a GPU and/or an FPGA.

<Step S22: Measure Performance>

At step S22, the performance measurement section 116 (see FIG. 2) executes the deployed file to measure the performance obtained when offloading is performed.

To find appropriate areas to be offloaded, the result of the performance measurement is returned to the offload area extraction section 114a. Then, the offload area extraction section 114a extracts another pattern. Then, the intermediate language file output section 114b executes a performance measurement for a trial using the extracted intermediate language (see reference sign e in FIG. 3).

As illustrated by reference sign e in FIG. 3, the control section 11 repeats steps from step S12 to step S22. The automatic offloading function of control section 11 can be summarized as follows. The parallel processing designation section 114 identifies loop statements (repeat statements) of the application and, for each repeat statement, specifies a directive specifying application of parallel processing by the GPU and performs compilation. Then, the parallel processing pattern creation section 115 excludes loop statements causing a compilation error from those to be offloaded and creates a plurality of parallel processing patterns each of which specifies whether to perform parallel processing for each of the loop statements not causing a compilation error. Then, for each of the plurality of parallel processing patterns, the binary file deployment section 116a of the performance measurement section 116 compiles the application according to the parallel processing pattern and deploys the compiled application to the verification machine 14 and the performance measurement section 116 executes processing for measuring the performance on the verification machine 14. The executable file creation section 117 selects a parallel processing pattern with the highest processing performance from all the parallel processing patterns subjected to the performance measurement on the basis of the result of the performance measurement repeated for a predetermined number of times and compile the selected parallel processing pattern with the highest processing performance to create an executable file.

<Step S23: Deploy Final Binary File to In-Service Environment>

At step S23, the in-service environment deployment section 118 determine a pattern specifying the final offload areas and deploys the pattern to the in-service environment.

<Step S24: Extract Performance Test Cases and Run Automatically>

At step S24, after the executable file has been deployed, the performance measurement test extraction section 119 extracts performance test items from the test case database 131 and performs an automatic execution of the extracted performance tests, in order to present the performance to the user.

<Step S25: Provide Information about the Price and Performance to a User for Judgement>

At step S25, the user presentation section 120 presents information about the price and performance and the like which are supported by the performance test result. The user judges whether to subscribe to the IoT service with billing in reference to the presented information about the prices, performance, and the like.

The above-described steps S11 to S25 are assumed to be performed in background of the use of the IoT service by the user during the initial day of a trial use, for example. To reduce the cost, processing to be performed in the background may be limited to optimization of function deployment and to offloading to a GPU and/or FPGA.

As described above, when the offloading server 1 is applied to an elementary technology of Tacit Computing, the control section (automatic offload function section) 11 of the offloading server 1 extracts, from the source code of the application to be used by the user, areas to be offloaded and outputs an intermediate language, in order to offload functional processing (steps S11 to S15). The control section 11 deploys the executable file derived from the intermediate language to the verification machine 14 and causes the verification machine 14 to execute the executable file to verify the effect of offloading (steps S21 to S22). The control section 11 repeats the verification, then determines appropriate offload areas, and then deploys the executable file to an in-service environment to be provided to the user, to provide as a service (steps S23 to S25).

[GPU Automatic Offloading Using GA]

GPU automatic offloading is a process of obtaining an offloading code to be deployed finally at step S23 by repeating steps S12 to S22 illustrated in FIG. 3

A GPU is a device that does not guarantee latency in general but is suitable for increasing throughput by parallel processing. There are wide variety of applications to be operated on IoT. Examples of typical applications include encryption of IoT data, image processing for analyzing camera videos, machine learning for analysis of a large amount of sensor data. Such applications involves many repetitive processes. In view of the foregoing, it is conceivable to offload repeat statements automatically to a GPU for acceleration.

However, as described in the description of conventional art, the acceleration requires appropriate parallel processing. In particular, in the case of using a GPU, it is often that good performance is not obtained unless the data size or the number of loops is large due to the memory to memory transfer between the CPU and GPU. In addition, depending on the timing of memory data transfer, some combinations of loop statements (repeat statements) that can be processed in parallel for acceleration may not be the fastest. For example, in a case of 10 for statements (repeat statements), even when the first, fifth, and tenth can be accelerated in comparison with the CPU, a combination of the three statements of the first, fifth, and tenth is not necessarily the fastest.

There is known an attempt of designating an appropriate parallel processing areas by determining whether to parallelize for statements by trial and error for optimization, by using PGI compiler. However, the trial-and-error approach requires a lot of operations and, in the event of providing the IoT service, delays the start of the service to be used by the user and increases the cost.

In view of this, the present embodiment automatically extracts appropriate offload areas from a general-purpose program that does not assume parallelization. For this purpose, the embodiment first checks if for statements can be parallelized and, for a set of for statements that can be parallelized, performs a performance verification trial repeatedly on a verification environment using GA to find appropriate areas. By narrowing down to the for statements that can be parallelized and holding and recombining a parallel processing pattern that may possibly achieve acceleration in a form of a part of gene, a pattern that achieves acceleration can be efficiently found from an enormous number of parallel processing patterns that can be made.

[Image of Finding by the Control Section (Automatic Offload Function Section) 11 Using Simple GA]

Figure 4:
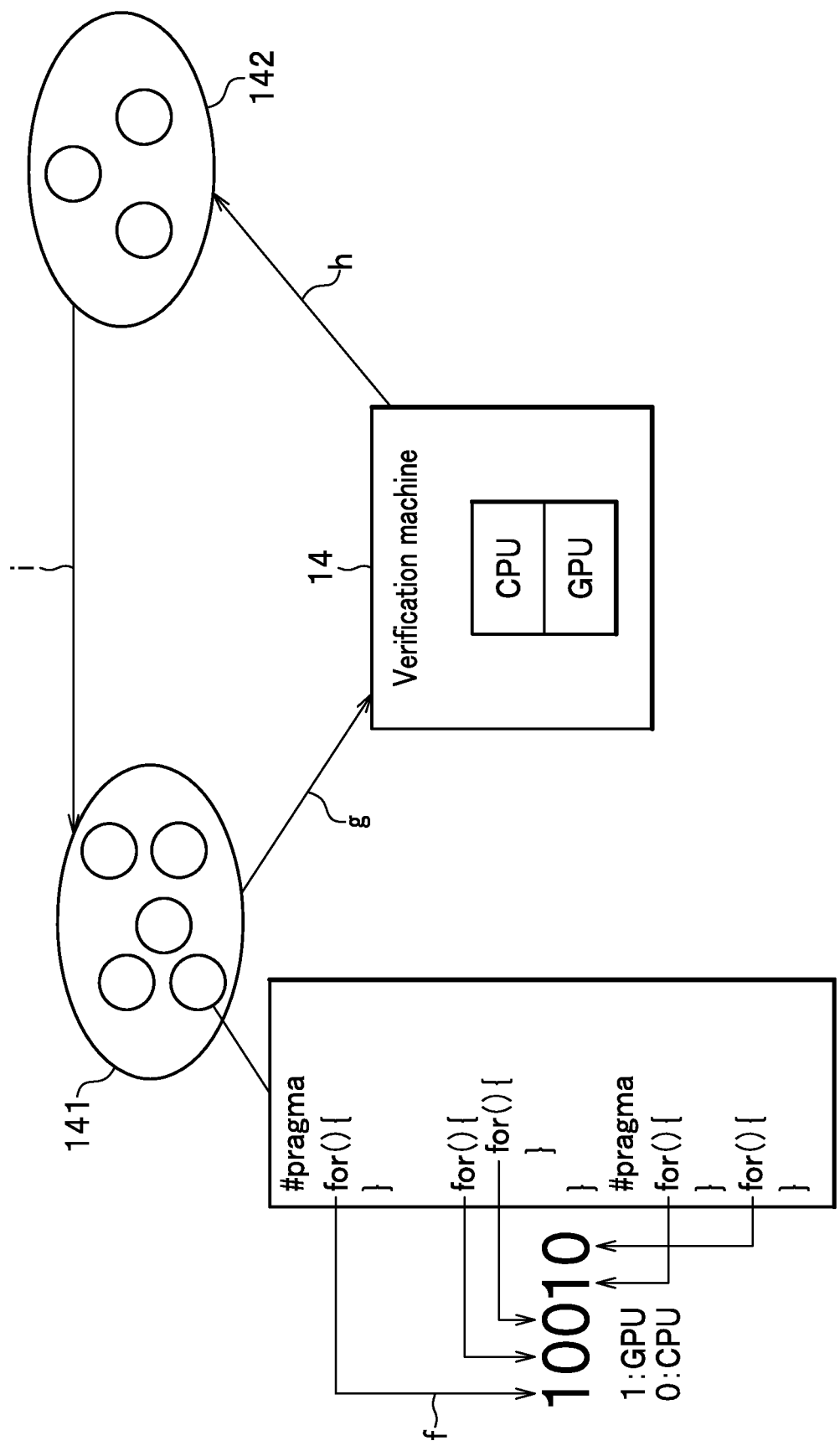
FIG. 4 is a diagram illustrating an image of finding processing by Simple GA of a control section (automatic offload function section) of the offloading server according to the embodiment.

FIG. 4 is a diagram illustrating an image of a find process by Simple GA of a control section (automatic offload function section) 11. FIG. 4 illustrates the find process image and illustrates gene sequence mapping of for statements.

GA is one of combinatorial optimization methods that imitate the evolutionary process of living things. The flowchart of GA includes initialization, evaluation, selection, crossover, mutation, and termination determination in this order.

In the present embodiment, Simple Ga, which is a simplified version of GA, is used. Simple GA is a GA simplified in such a manner that a gene is a sequence of only 1 and 0, roulette selection and one-point crossover are employed, and mutation is performed by reversing one element of the gene.

<Initialization>

In the initialization process, all the for statements in the application code is checked as to whether they can be parallelized and then the for statements that can be parallelized are mapped to a gene sequence. The for statements to be processed by a GPU are assigned a value of 1 and the for statements not to be processed by the GPU are assigned a value of 0. The genes are prepared for a specified M number of individuals in such a manner that one for statement is assigned a value of 1 or 0 randomly.

Specifically, the control section (automatic offload function section) 11 (see FIG. 2) retrieves the application code 130 (see FIG. 3) to be used by the user, and checks as to whether the for statements can be parallelized on the basis of the code patterns 141 of the application code 130 as illustrated in FIG. 4. As illustrated in FIG. 4, when five for statements are found in the code pattern 141 (see reference sign f in FIG. 4), one digit of 1 or 0 is randomly assigned for each for statement, and as a result, five digits of 1 or 0 is assigned to the five for statements. For example, a value of 0 is assigned for the cases in which the processing is to be performed by the CPU, and a value of 1 is assigned for the cases in which processing is to be outsourced to the GPU. In this stage, however, a value of 1 or 0 is randomly assigned.

In this case, the length of the gene is five digits. Five-digit gene sequence code has 32 (=$2^5$) patterns, including 10001, 10010, . . . . Note that in FIG. 4, circles in the code pattern 141 are presented as images of the code.

<Evaluation>

In the evaluation process, deployment and performance measurement are carried out (see reference sign g in FIG. 4). Specifically, the performance measurement section 116 (see FIG. 2) compiles a code corresponding to the gene, deploys the compiled code to the verification machine 14, and executes the deployed code. The performance measurement section 116 carries out benchmark performance measurement. A gene corresponding to a pattern (parallel processing pattern) with good performance is regarded as having a higher degree of adaptability.

<Selection>

In the selection process, high performance code patterns are selected on the basis of the degree of adaptability (see reference sign h in FIG. 4). The performance measurement section 116 (see FIG. 2) selects genes with a high degree of adaptability whose number is the same as the specified number of individuals, according to the degree of adaptability. The present embodiment performs roulette selection according to the degree of adaptability and elite selection of selecting the gene with the most adaptability.

FIG. 4 illustrates that, as an image of the find process, the number of the circles has reduced to three in the selected code patterns 142.

<Crossover>

In the crossover process, with a certain crossover ratio Pc, a sequence element at one point in gene is switched between selected individuals to create a child as an individual.

A gene of a pattern (parallel processing pattern) and a gene of another pattern, which are selected by roulette selection, are subjected to the crossover process. The position of the sequence element to be subjected to the one-point crossover can be arbitrarily selected. For example, the crossover is performed at the third digit of the above-described five-digit code.

<Mutation>

In the mutation process, the value of each sequence element of the gene of an individual is changed from 0 to 1 or from 1 to 0 with a certain mutation ratio Pm.

We introduce the mutation process to avoid local solutions. It should be noted that the mutation process may not necessarily be performed to reduce the amount of calculation.

<Determination of Termination>

As illustrated in FIG. 4, next-generation code patterns after crossover and mutation processes are generated (see reference sign i in FIG. 4)

Termination is determined when the process is repeated for a specified T number of generations, and the process is terminated. A gene with the highest adaptability is selected as the solution.

For example, assume that performance measurement has been carried out and three of 10010, 01001, and 00101 have been selected. A next generation, e.g., a new pattern 10101 (parallel processing pattern), is generated by recombining the three using GA. In this event, the recombined pattern is modified by mutation, for example by arbitrarily changing 0 to 1. The above-described process is repeated to find the fastest pattern. The number of generations (e.g., 20 generations) and the like are specified and a pattern remaining at the final generation is regarded as the final solution.

<Deployment>

A parallel processing pattern with the highest processing performance, which corresponds to the gene with the highest degree of adaptability, is formally deployed to the in-service environment.

<Supplementally Explanation>

A description will be given of a case in which a considerable number of for statements (loop statements/repeat statements) that cannot be offloaded to a GPU are present. For example, even in a case in which 200 for statements are present, only about 30 for statements may be offloaded to a GPU. This 30 for statements are selected by excluding for statements causing an error and GA is performed for this 30 for statements.

OpenACC provides a compiler that allows specifying "#pragma acc kernels" directives to extract bytecode for GPU and to perform GPU offloading by executing the bytecode. By writing a command for a for statement in this #pragma, it is possible to determine whether the for statement can operate on the GPU.

In a case of using C/C++, the C/C++ code is analyzed to find for statements. When a for statement is found, a statement is written for the for statement using "#pragma acc kernels", which is a syntax defined in OpenACC for parallel processing. In detail, for statements are inserted into an empty "#pragma acc kernels" one by one and compiled. If an error occurs for a for statement, the for statement cannot be processed by the GPU in the first place and thus is excluded. In this way, remaining for statements are found. The number of the for statements not causing an error is determined as the length (gene length). If the number of for statements not causing an error is 5, the gene length is 5; and if the number of for statements not causing an error is 10, the gene length is 10. Incidentally, a for statement that cannot be processed in parallel has data dependency such that the result of the previous processing is used in the next processing.

The process up to here is in the preparation stage. The GA process is carried out next.

Up to here, code patterns with a gene length corresponding to the number of the for statements have been obtained. Initially, parallel processing patterns, e.g., 10010, 01001, 00101 . . . , are assigned randomly. GA processing is performed, and compilation is performed. In this event, an error could occur even with a for statement that is offloadable. This is the case in which the for statement is in a hierarchy (GPU processing is possible by designating either one of the hierarchy). In such a case, the for statement having caused the error may be kept. Specifically, it is conceivable to generate a timeout masqueraded as being caused due to an increased processing time.

The parallel processing patterns are deployed to the verification machine 14 to be subjected to a benchmark testing. That is, when the processing to be offloaded is image processing, the image processing is subjected to the benchmark testing. The shorter the time consumed in the processing, the parallel processing pattern is evaluated as having a higher degree of adaptability. For example, the evaluation is given as an inverse of processing time. A value of 1 is given to processing that takes 10 seconds; a value of 0.1 is given to processing that takes 100 seconds; and a value of 10 is given to processing that takes 1 second.

Parallel processing patterns with a high degree of adaptability are selected. For example, 3 to 5 parallel processing patterns are selected from 10 parallel processing patterns. Then, the selected parallel processing patterns are recombined to create new code patterns. In the middle of the recombination process, a code pattern that is the same as one that has been tested could be created. In such a case, there is no need of performing the same benchmark testing and thus the same data as the data of the one that has been tested is used. In the present embodiment, the code patterns and their processing time periods are stored in the storage section 13.

Heretofore, an image of the find process by Simple GA of the control section (automatic offload function section) 11 has been described. Next, a description will be given of a batch processing method for data transfer.

[Batch Processing Method for Data Transfer]

As described above, a genetic algorithm is utilized to automatically tune parallel processing parts that can be effectively processed by GPU processing. However, depending on data transfer between CPU and GPU memories, some applications cannot be improved in performance. For this reason, it is difficult for an unskilled user to improve the performance of an application using GPU. In addition, even when using an automatic parallelization technique, try-and-error operations are necessary to determine whether parallel processing can be performed, and there are cases in which acceleration is not possible.

In view of this, the present embodiment provides a technique by which as many application as possible can be automatically improved in performance using GPU and the number of data transfers to GPU can be reduced.

<Basic Idea>

The specification of OpenACC or the like defines, in addition to directives that specify parallel processing by GPU, directives (hereinafter referred to as explicit directive(s)) that each explicitly specify a CPU-to-GPU or GPU-to-CPU data transfer. The explicit directives of OpenACC or the like includes: #pragma acc data copyin, which is a CPU-to-GPU data transfer directive (a directive is an instruction or designation command with a special sign at the beginning of the statement), #pragma acc data copyout, which is a GPU-to-CPU data transfer directive, and #pragma acc data copy, which is a CPU-to-GPU-to-CPU data transfer directive.

According to the present invention, to reduce ineffective data transfers, data transfer operations are specified using explicit directives in combination with the extraction of parallel processing using GA.

In the present embodiment, for each individual generated by GA, reference relationships of the variable data used in loop statements are analyzed. Then, for data that can be transferred outside a loop, a data transfer outside the loop is explicitly designated, rather than transferring the data at every iteration of the loop.

Comparative Example

Hereinafter, the process is specifically described.

First, a description will be given of a comparative example.

In this case, the types of the data transfers include a CPU-to-GPU data transfer and a GPU-to-CPU data transfer.

Figure 5:
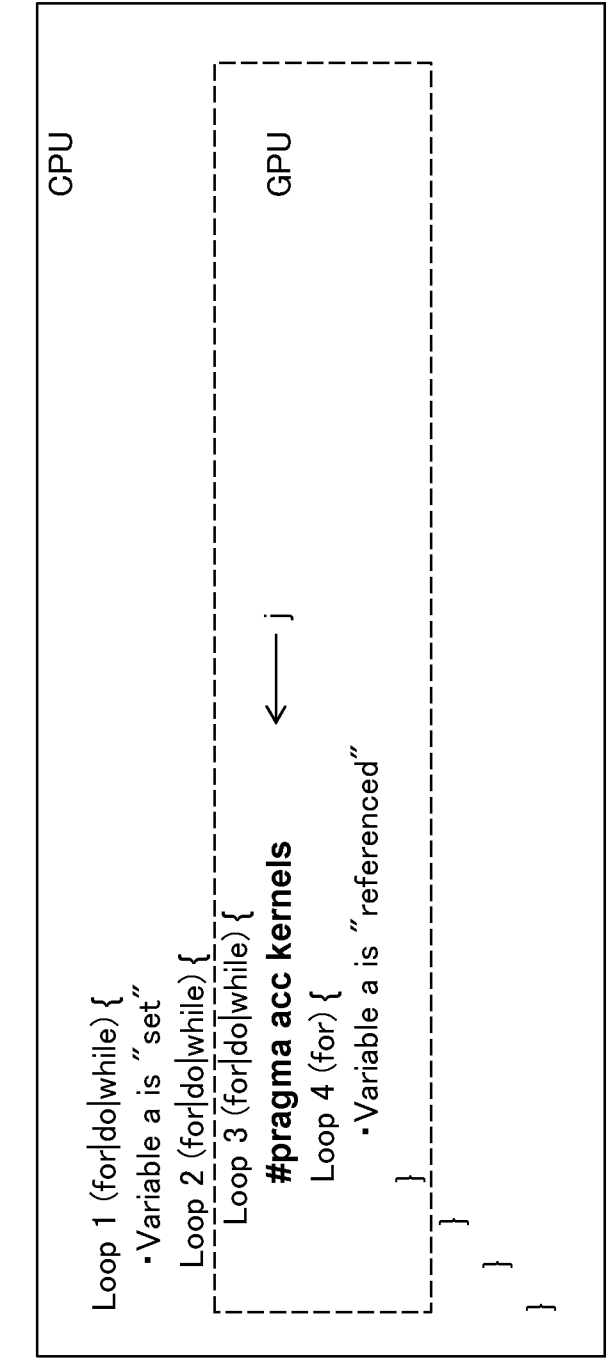
FIG. 5 illustrates loop statements of a comparative example involving a CPU-to-GPU data transfer, in which loop statements a variable defined on the CPU program side is referenced by the GPU program side.
Figure 6:
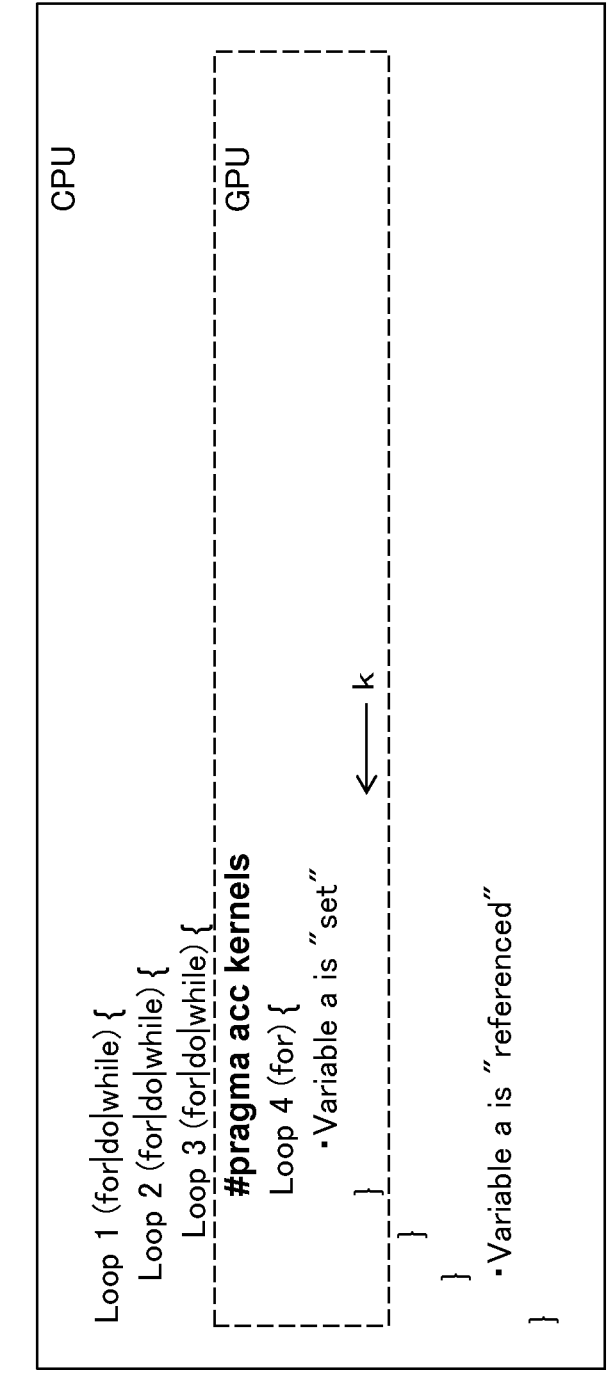
FIG. 6 illustrates loop statements of a comparative example involving a GPU-to-CPU data transfer, in which loop statements a variable referenced on the CPU program side is set by the GPU program side.

FIGS. 5 and 6 each illustrate loop statements (repeat statements) of a source code of an application to be processed by an automatic offload function section of the comparative example. In these cases, a variable defined on the CPU program side is referenced or set by the GPU program side.

The automatic offload function section of the comparative example corresponds to the control section (automatic offload function section) 11, illustrated in FIG. 2, from which the data transfer designation section 113 has been eliminated or in which the data transfer designation section 113 is not executed.

<<CPU-to-GPU Data Transfer of Comparative Example>>

FIG. 5 illustrates loop statements of a comparative example involving a CPU-to-GPU data transfer, in which loop statements a variable defined on the CPU program side is referenced by the GPU program side. Incidentally, numbers 1 to 4 indicated after loop statements denoted in the succeeding descriptions and in FIG. 5 are given for the sake of convenience of explanation (the same applies to other figures and explanations thereof).

The loop statements of the comparative example illustrated in FIG. 5 is described on the CPU program side and include:

```
Loop 1 (for|do|while) {
},
which includes
Loop 2 (for|do|while) {
},
which includes
Loop 3 (for|do|while) {
},
which includes
Loop 4 (for) {
}.
```

In Loop 1 (for|do|while) { }, a variable a is set, and in Loop 4 (for|do|while) { }, the variable a is referenced.

Moreover, in Loop 3 (for|do|while) { }, a processing part for which parallel processing by PGI compiler for a for statement or the like is available is specified with a directive of OpenAcc: #pragma acc kernels (directive specifying application of parallel processing) (details described later).

According to the loop statements of the comparative example illustrated in FIG. 5, a CPU-to-GPU data transfer occurs every time at timing indicated by reference sign j in FIG. 5. Therefore, there is a demand to reduce the number of data transfers to GPU.

<<GPU-to-CPU Data Transfer of Comparative Example>>

FIG. 6 illustrates loop statements of a comparative example involving a GPU-to-CPU data transfer, in which loop statements a variable referenced on the CPU program side is set by the GPU program side.

The loop statements of the comparative example illustrated in FIG. 6 is described on the CPU program side and include:

```
Loop 1 (for|do|while) {
},
which includes
Loop 2 (for|do|while) {
},
which includes
Loop 3 (for|do|while) {
},
which includes
Loop 4 (for) {
}.
        Moreover, in Loop 3 (for|do|while) {
        }, a processing part for which parallel processing by PGI
        compiler for a for statement or the like is available is specified
        with a directive of OpenAcc: #pragma acc kernels (directive
        specifying application of parallel processing) (details described
        later).
            In Loop 4 (for) {
        }, a variable a is set, and in Loop 1 (for|do|while) {
        }, the variable a is referenced.
```

According to the loop statements of the comparative example illustrated in FIG. 6, a GPU-to-CPU data transfer occurs every time at timing indicated by reference sign k in FIG. 6. Therefore, there is a demand to reduce the number of data transfers to CPU.

Next, a description will be given of a batch processing method for data transfer by an offloading server 1 of the present embodiment.

Figure 7:
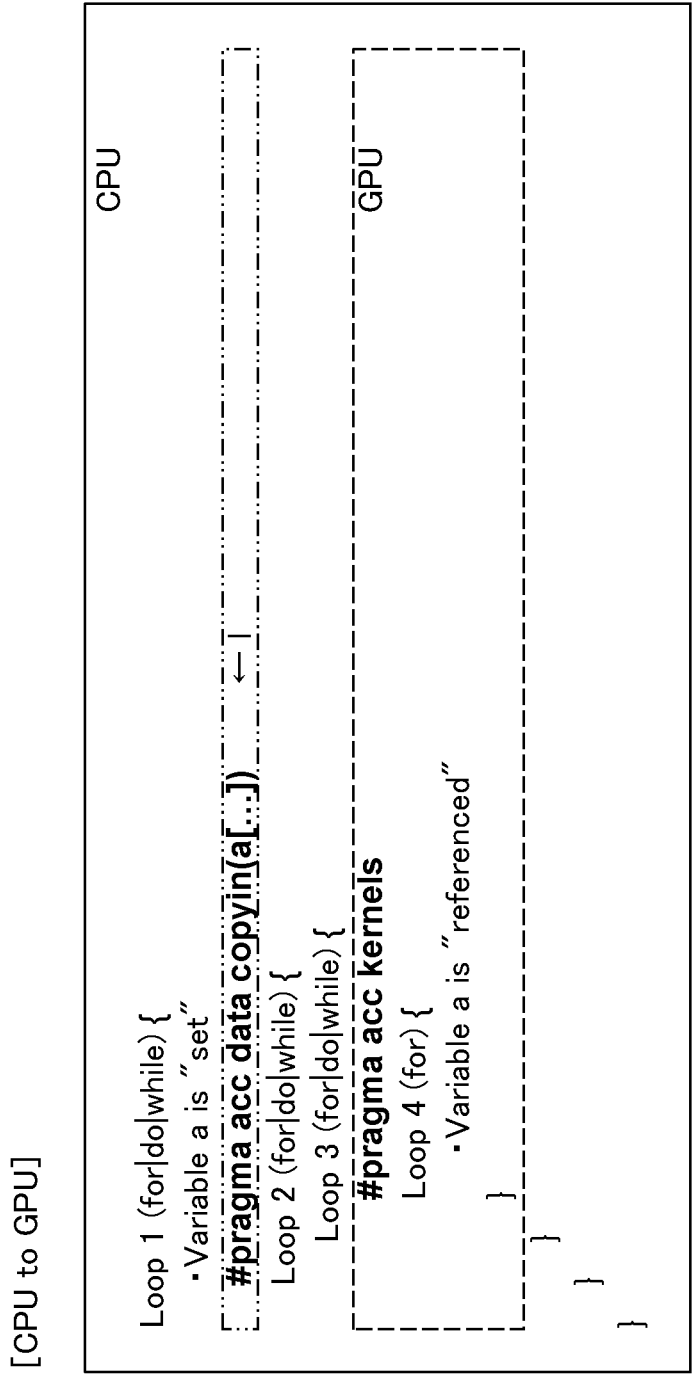
FIG. 7 illustrates an example having loop statements involving a CPU-to-GPU data transfer in the offloading server according to the embodiment, in which loop statements a variable defined on the CPU program side is referenced by the GPU program side.
Figure 8:
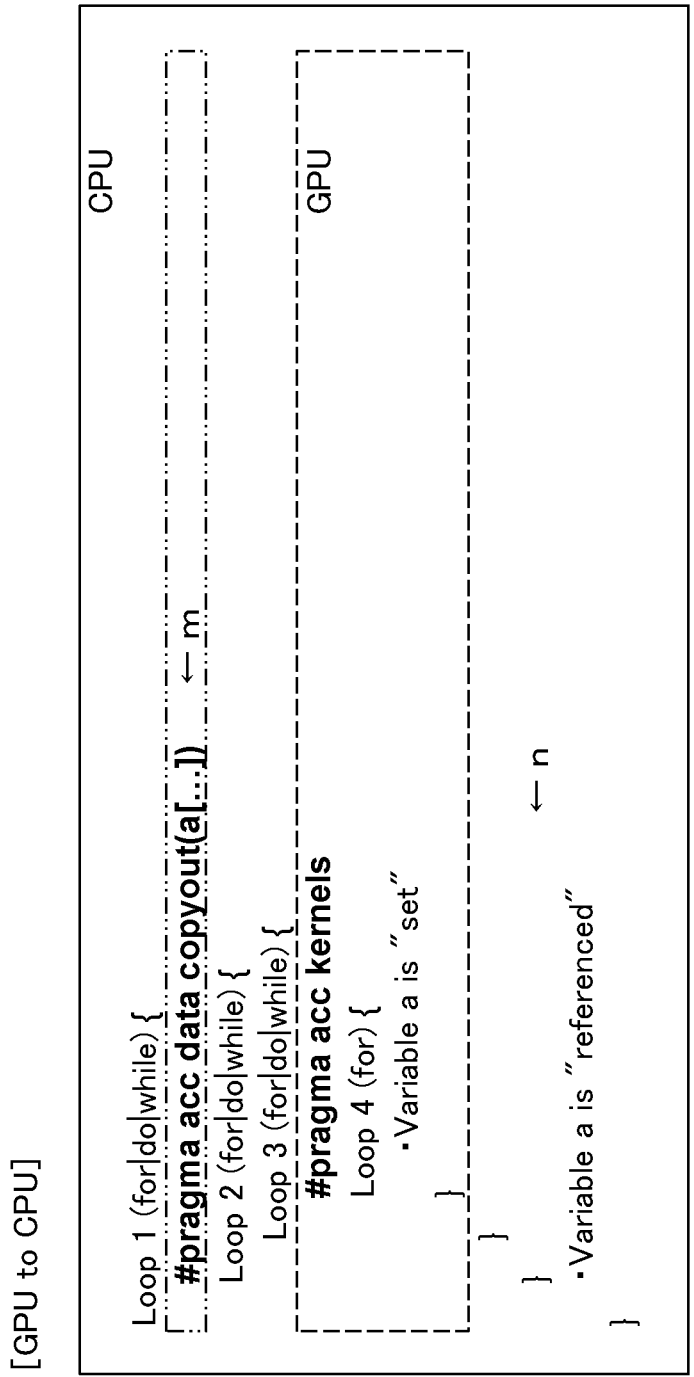
FIG. 8 illustrates an example having loop statements involving a GPU-to-CPU data transfer in the offloading server according to the embodiment, in which loop statements a variable referenced on the CPU program side is set by the GPU program side.

FIGS. 7 and 8 each illustrate loop statements of a source code of an application to be processed by an automatic offload function section of the present embodiment. In these cases, a variable defined on the CPU program side is referenced or set by the GPU program side.

The control section (automatic offload function section) 11 (see FIG. 2) of the present embodiment includes the data transfer designation section 113.

<<CPU-to-GPU Data Transfer of Present Embodiment>>

According to the present embodiment, if a variable set and/or defined on the CPU program side is to be referenced by the GPU program side, the need of a CPU-to-GPU data transfer is recognized and a data transfer designation is made.

The position at which the data transfer designation is made is immediately before the loop to be processed by the GPU or immediately before a loop which is the outermost loop of nested loops including the loop to be processed by the GPU and one or more outer loops of the loop to be processed by the GPU and including neither setting nor definition of the variable (see FIG. 7). The insertion position of the data transfer directive is immediately before a loop, e.g., a for, do, or while loop.

FIG. 7 illustrates an example having loop statements involving a CPU-to-GPU data transfer, in which loop statements a variable defined on the CPU program side is referenced by the GPU program side. FIG. 7 corresponds to the comparative example illustrated in FIG. 5.

The loop statements of the example illustrated in FIG. 7 is described on the CPU program side and include:

```
Loop 1 (for|do|while) {
}
which includes
Loop 2 (for|do|while) {
}
which includes
Loop 3 (for|do|while) {
}
which includes
Loop 4 (for) {
}.
    In Loop 1 (for|do|while) {
    }, a variable a is set, and in Loop 4 (for) {
    }, the variable a is referenced.
        Moreover, in Loop 3 (for|do|while) {
        }, a processing part for which parallel processing by PGI
        compiler for a for statement or the like is available is specified
        with a directive of OpenAcc: #pragma acc kernels (directive
        specifying application of parallel processing) (details described
        later).
```

In the loop statements of the present embodiment illustrated in FIG. 7, the data transfer directive #pragma acc data copyin(a[ . . . ]), a copyin clause of the variable a, is inserted at the position indicated by reference sign 1 in FIG. 7.

In the example shown in FIG. 7, the above-mentioned data transfer directive #pragma acc data copyin(a[ . . . ]) is specified immediately before Loop 2 (for|do|while), which is the outermost loop that includes neither setting nor definition of the variable a.

In this manner, a CPU-to-GPU data transfer is explicitly designated by inserting a copyin clause of variable a: #pragma acc data copyin(a[ . . . ]) at the position described above. With this, the data transfer can be performed in a batch manner at a loop located as outer as possible, thereby to avoid ineffective data transfer such that data is transferred at every loop iteration as indicated by reference sign j in the comparative example illustrated in FIG. 5.

<<GPU-to-CPU Data Transfer of Present Embodiment Example 1)>>

According to the present embodiment, if a variable set on the GPU program side is one referenced, set, or defined by the CPU program side or the variable is a global variable (a variable that can be directly accessed from all the functions), the need of a GPU-to-CPU data transfer is recognized and a data transfer designation is made.

The position at which the data transfer designation is made is immediately before the loop to be processed by the GPU or immediately before a loop which is the outermost loop of nested loops including the loop to be processed by the GPU and one or more outer loops of the loop to be processed by the GPU and including neither reference, setting, nor definition of the variable except in the loop to be processed by the GPU (see FIG. 8 and relevant description). The insertion position of the data transfer directive is immediately before a loop, e.g., a for, do, or while loop.

Figure 9:
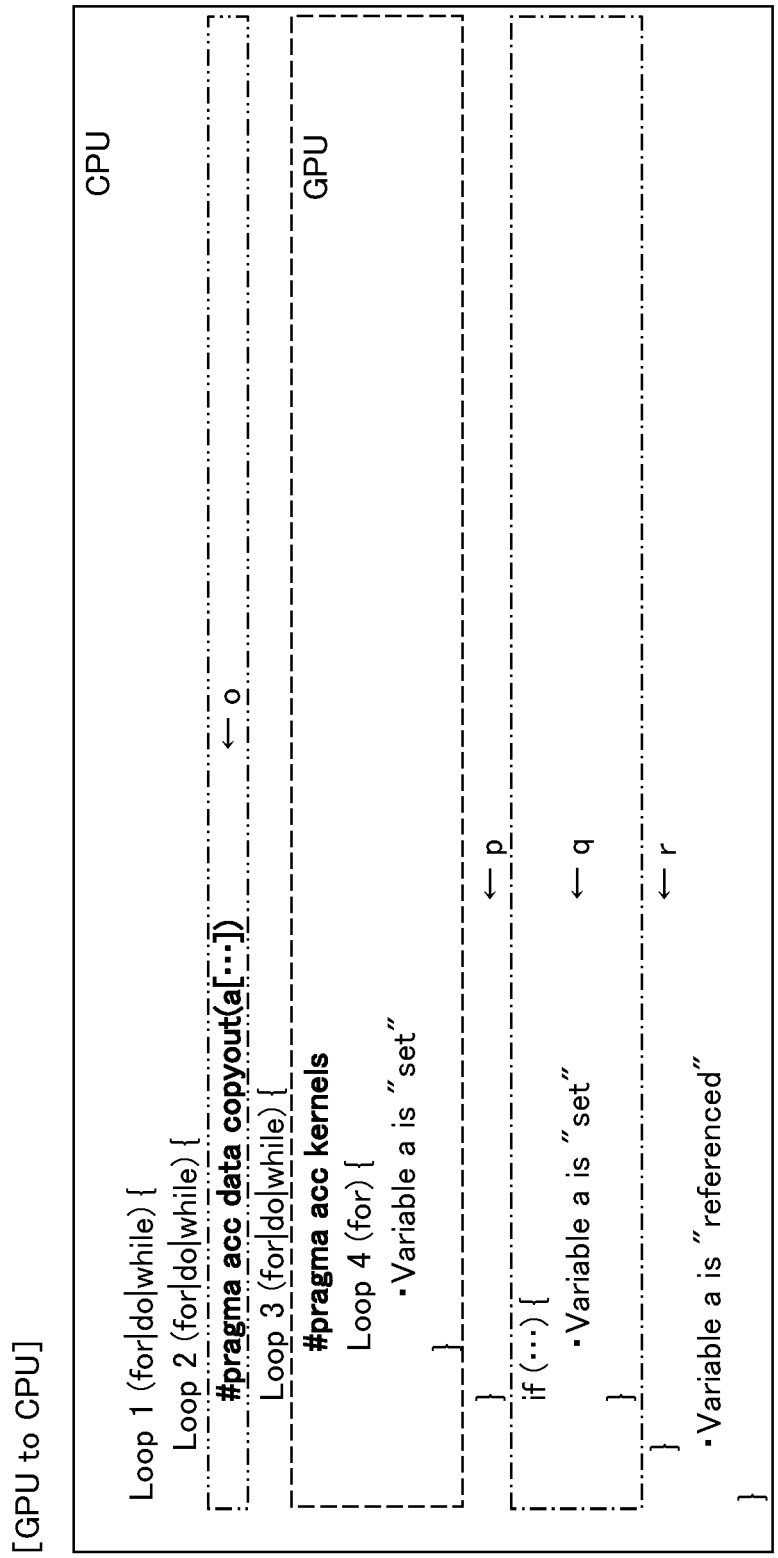
FIG. 9 illustrates an example having loop statements involving a GPU-to-CPU data transfer in the offloading server according to the embodiment, in which loop statements a variable referenced on the CPU program side is set by the GPU program side and the variable is set based on the result of an if statement.

The condition regarding "setting" is introduced to take into account cases in which the setting may or may not be performed according to the result of an if statement (see FIG. 9 and relevant description). In addition, the condition regarding "definition" on the CPU side is introduced to provide a guard against exceeding beyond the scope of the variable. The condition regarding global variables is introduced because global variables are possibly "referenced" outside the source code to be analyzed.

FIG. 8 illustrates an example having loop statements involving a GPU-to-CPU data transfer, in which a variable referenced on the CPU program side is set by the GPU program side. FIG. 8 corresponds to the comparative example illustrated in FIG. 6.

The loop statements of the example illustrated in FIG. 8 is described on the CPU program side and include:

---

Loop 1 (for|do|while) {
},
which includes
Loop 2 (for|do|while) {
},
which includes
Loop 3 (for|do|while) {
},
which includes
Loop 4 (for) {
}.
  In addition, in Loop 3 (for|do|while) {
}, a processing part for which parallel processing by PGI compiler for a for statement or the like is available is specified with a directive of OpenAcc: #pragma acc kernels (directive specifying application of parallel processing).
    In Loop 4 (for|do|while) {
}, a variable a is set and in Loop 1 (for|do|while) {
}, the variable a is referenced.

---

In the loop statements of the present embodiment illustrated in FIG. 8, the data transfer directive #pragma acc data copyout(a[ . . . ]), a copyout clause of the variable a, is inserted at the position indicated by reference sign m in FIG. 8.

In the example shown in FIG. 8, the above-mentioned data transfer directive #pragma acc data copyout(a[ . . . ]) is specified immediately before Loop 2 (for|do|while), which is the outermost loop that includes neither reference, setting, nor definition of the variable a except in the loop processed by GPU.

The above-described copyout operation is executed after completion of the loop as indicated by reference sign n in FIG. 8.

In this manner, a GPU-to-CPU data transfer is explicitly specified by inserting a copyout clause of variable a: #pragma acc data copyout(a[ . . . ]) at the position described above. With this, the data transfer can be performed in a batch manner at a loop located as outer as possible, thereby to avoid ineffective data transfer such that data is transferred at every loop iteration as indicated by reference sign k in the comparative example illustrated in FIG. 6.

<<GPU-to-CPU Data Transfer of Present Embodiment Example 2)>>

FIG. 9 illustrates an example having loop statements involving a GPU-to-CPU data transfer, in which loop statements a variable referenced on the CPU program side is set by the GPU program side and the variable is set based on the result of an if statement.

The loop statements of the example illustrated in FIG. 9 is described on the CPU program side and include:

---

Loop 1 (for|do|while) {
},
which includes
Loop 2 (for|do|while) {
},
which includes
Loop 3 (for|do|while) {
}
and
if (...) {
},
wherein Loop 3 (for|do|while) includes
Loop 4 (for) {
}.
  In addition, in Loop 3 (for|do|while) {
}, a processing part for which parallel processing by PGI compiler for a for statement or the like is available is specified with a directive of OpenAcc: #pragma acc kernels (directive specifying application of parallel processing).
    In Loop 4 (for|do|while) {
}, a variable a is set, and in Loop 1 (for|do|while) {
}, the variable a is referenced .

---

In the loop statements of the present embodiment illustrated in FIG. 9, the data transfer directive #pragma acc data copyout(a[ . . . ]), a copyout clause of the variable a, is inserted at the position indicated by reference sign o in FIG. 9.

In the example shown in FIG. 9, the above-mentioned data transfer directive #pragma acc data copyout(a[ . . . ]) is specified immediately before Loop 3 (for|do|while), which is the outermost loop that includes neither reference, setting, nor definition of the variable a except the loop to be processed by GPU.

The above-described copyout operation is executed after completion of Loop 3 as indicated by reference sign p in FIG. 9.

In FIG. 9, Loop 2 (for|do|while) includes Loop 3 (for|do|while) and if ( . . . ), in each of which "setting" of the variable a is performed. For this reason, the above-described insertion of #pragma acc data copyout(a[ . . . ]) has to be before the position indicated by reference sign q in FIG. 9, i.e., in this case, before "setting" of variable a in if ( . . . ) { }, which otherwise would cause a problem. For example, a problem would occur if the insertion is at the position indicated by reference sign r in FIG. 9.

In this manner, a GPU-to-CPU data transfer is explicitly specified by inserting a copyout clause of variable a: #pragma acc data copyout(a[ . . . ]) at the position described above. With this, the data transfer can be performed in a batch manner at a loop located as outer as possible, thereby to avoid ineffective data transfer such that data is transferred at every loop iteration as indicated by reference sign k in the comparative example illustrated in FIG. 6.

<<Data Transfer in the Both Directions, CPU-to-GPU Data Transfer and GPU-to-CPU Data Transfer, of the Present Embodiment>>

When a CPU-to-GPU transfer and a GPU-to-CPU transfer are both to be performed on the same variable, they are collectively specified as data copies in the both directions.

Specifically, a directive #pragma acc data copy(a[ . . . ]) is inserted in place of the directive #pragma acc data copyin(a[ . . . ]) in the loop statements of the present embodiment illustrated in FIG. 7.

In the example shown in FIG. 7, the above-mentioned data transfer directive #pragma acc data copy(a[ . . . ]) is to be specified immediately before Loop 2 (for|do|while), which is the outermost loop that includes neither setting nor definition of the variable a except the loop to be processed by GPU.

In this manner, data transfers in the both direction, a CPU-to-GPU data transfer and a GPU-to-CPU data transfer, are explicitly designated by inserting a copy clause of variable a: #pragma acc data copy(a[ . . . ]) at the position described above. Using the directive #pragma acc data copy(a[ . . . ]), the insertion of the directive #pragma acc data copyout(a[ . . . ]) illustrated in FIG. 8 is omitted.

As described in comparison with the comparative examples with reference to FIGS. 5 to 9, according to the present embodiment, data transfer is explicitly specified so as to be performed in a batch manner at a loop located as outer as possible, thereby to avoid ineffective data transfer such that data is transferred at every loop iteration.

[GPU Offload Processing]

By the above-described batch processing method of data transfer, it is possible to extract loop statements suitable to offloading and avoid ineffective data transfer.

However, even with the above-described batch processing method of data transfer, there exist programs not suitable to GPU offloading. Effective GPU offloading requires a large number of loop iterations of the processing to be offloaded.

In view of this, the present embodiment investigates the number of loop iterations using a profiling tool as a preliminary stage of a full-blown, offload process finding operation. Using a profiling tool makes it possible to investigate the number of executions of each statement. For example, a program including loop iterations of 50 million can be selected prior to being subjected to the offload process finding operation. Hereinbelow, specific description will be given (in a manner partially overlapped with the above description given with reference to FIG. 4).

The present embodiment first analyzes the application in which offload processing parts are to be found to identify loop statements such as for, do, and while statements. Next, the embodiment executes the processing of the application as a sample to investigate the number of loop iterations of each loop statement, thereby to determine whether to perform a full-blown, offload process finding operation on the basis of whether the number of the loop iterations is a certain number or more.

when it is determined that a full-blown, offload process finding operation is to be performed, the GA process is started (see FIG. 4 and relevant descriptions). In the initialization process, all the loop statements in the application code is checked as to whether they can be parallelized and then the loop statements that can be parallelized are mapped to a gene sequence, with each loop statement given either a value of 1, indicating that the loop statement is to be processed by GPU processing, or a value of 0, indicating that the loop statement is not to be processed by GPU. The genes are prepared for a specified number of individuals in such a manner that the statements of each individual are each assigned a value of 1 or 0 randomly.

In the code corresponding to a gene, an explicit data transfer directive (#pragma acc data copyin/copyout/copy) is added according to the reference relationships of the variable data in the loop statement designated as being subjected to a GPU process In the evaluation process, a code corresponding to the gene is compiled, and the compiled code is deployed to the verification machine and executed thereon to perform a benchmark performance measurement. A gene corresponding to a pattern with good performance is regarded as having a higher degree of adaptability. In the code corresponding to the genes, as described above, a parallel processing directive (e.g., see reference sign j in FIG. 5) and data transfer directive(s) (e.g., see sign l in FIG. 7, reference sign m in FIG. 8, and reference sign o in FIG. 9) are inserted.

In the selection process, a specified number of individuals corresponding to genes with a high degree of adaptability are selected according to the degree of adaptability. The present embodiment performs roulette selection according to the degree of adaptability and elite selection of selecting the gene with the most adaptability. In the crossover process, with a certain crossover ratio Pc, a sequence element at one point in gene is switched between selected individuals to create a child as an individual. In the mutation process, the value of each sequence element of the gene of an individual is changed from 0 to 1 or from 1 to 0 with a certain mutation ratio Pm.

When the processes up to the mutation process are finished and genes of a specified number of individuals of the next generation are created, explicit data transfer directive(s) is/are added in the same manner as the initialization process and then evaluation, selection, crossover, and mutation processes are repeated.

Termination is determined when the processes are repeated for a specified number of generations, and the processes are terminated. A gene with the highest adaptability is selected as the solution. A code pattern with the highest performance, which corresponds to the gene with the highest degree of adaptability, is formally deployed to the in-service environment to be provided to the users.

Hereinbelow, a description will be given of an implementation of the offloading server 1. This implementation was made to confirm the validity of the present embodiment.

[Implementation]

A description will be given of an implementation that automatically offloads a C/C++ application using the general-purpose PGI compiler.

As the purpose of the implementation is to confirm the validity of the GPU automatic offloading, the target application is a C/C++ application and the GPU processing itself is performed using conventional PGI compiler.

C/C++ languages are quite popular in the development of OSS (Open Source Software) and proprietary software. Many applications have been developed in C/C++ language. To verify the offloading of applications used by general users, we use general-purpose OSS applications such as one for cryptographic processing or image processing.

Processing for GPU is compiled with PGI compiler. PGI compiler is a compiler that interprets OpenACC for C/C++/Fortran languages. The present embodiment specifies codes that can be processed in parallel, such as for statements, with the OpenACC directive "#pragma acc kernels" (parallel processing directive). This makes it possible to extract bytecode for GPU and to perform GPU offloading by executing the bytecode. The present embodiment specifies issues an error in such a case that parallel processing is not possible due to the dependency between data in for statements or that plural hierarchies in nested for statements are specified. In addition, the present embodiment allows specifying explicit data transfers by directives #pragma acc data copyin/copyout/copy and the like.

In the future, to also handle FPGAs in a uniform fashion, it will be necessary to extract common intermediate language such as OpenCL to execute it on heterogeneous devices like FPGAs and GPUs. In the present embodiment, GPU processing itself is expressed in an intermediate language to be processed by the PGI compiler using CUDA (Compute Unified Device Architecture), to focus on the automatic extraction of the code to be offloaded.

Explicit designation of data transfer is made by inserting the OpenACC copyin/copyout/copy clauses #pragma acc data copyin/copyout/copy(a[ . . . ]) at the above-described positions, in combination with the designation by #pragma acc kernels (parallel processing directive).

<Gist of Operation by the Implementation>

A description will be given of gist of the operation of the implementation.

The implementation is made using Perl 5 (Perl version 5) to perform the following processing.

Before starting the below-described processing of the flow illustrated in FIG. 10, a C/C++ application to be accelerated and a tool for benchmark testing for the performance measurement of the application are prepared.

The implementation analyzes, upon receipt of a request for utilizing the C/C++ application, the code of the C/C++ application to discover for statements and understand the program structure in terms of variable data or the like used in the for statements. The implementation performs the syntax analysis using LLVM/Clang syntax analysis library (python binding of libClang) or the like.

The implementation first executes benchmark testing to estimate the effectiveness of GPU offloading of the application and gets the number of loop iterations of the for statements identified by the syntax analysis. The GNU coverage gcov or the like is used to get the number of loop iterations. Known profiling tools include "GNU profiler gprof" and "GNU coverage gcov". Either of them can be used as they both are capable of investigating the number of executions of a statement. An example of the condition for applications to be chosen as to the number of executions is such that only applications with 10 million or more loop iterations be chosen. This number of loop iterations is modifiable.

A general-purpose, CPU-based application has not been implemented assuming parallelization. For this reason, for statements for which GPU processing is in the first place impossible need to be excluded. The implementation inserts, as a trial, the directive "#pragma acc kernels" for parallel processing for each of the for statements and determines whether a compilation error occurs. Several kinds of compilation errors are defined. Examples of the errors include a case in which an external routine is called in a for statement, a case in which different hierarchy levels are designated in a duplicate manner in nested for statements, a case in which there is processing to exit a for statement by a break statement or the like, and a case there is dependency between data in for statements. Errors other than described above could be issued as various compilation errors in a manner depending on the application. The implementation excludes for statements causing a compilation error from ones to be processed and thus does not insert the #pragma directive for such for statements.

Compilation errors are difficult to be processed automatically. In addition, it is often that processing compilation errors even results in no effect. In the case of calling an external routine, the compilation error could be sometimes avoided by "#pragma acc routine". However, most of the calling to an external routine is a call to a library. Even when the call is included in the GPU processing, the call becomes a bottleneck and performance does not appear. As the for statements are processed for trial one by one, no compilation error occurs in connection with nesting. In the case of intermediate exiting with a break statement or the like, as the parallel processing requires the number of loops be fixed, the program needs to be modified. In the case of presence of data dependency, the parallel processing is in the first place impossible.

Assume that the number of loop statements that do not cause an error even when processed in parallel is A, the gene length is A. The application code is mapped to a gene with length A in such a manner that a gene element with a value of 1 corresponds to presence of a parallel processing directive and a gene element with a value of 0 corresponds to absence of a parallel processing directive.

Next, gene sequences whose number is specified as the number of individuals are prepared as initial values. The genes are each randomly assigned a value of 0 or 1 as described with reference to FIG. 4. According to the prepared gene sequence, a parallel processing designation directive #pragma acc kernels is inserted into the C/C++ code for each gene assigned a value of 1. At this stage, in a code segment corresponding to a certain gene, a part to be processed by the GPU is determined. On the basis of the reference relationships analyzed by the above-mentioned Clang regarding the variable data in for statements, directives for CPU-to-GPU data transfers and data transfers in the opposite direction are specified in accordance with the above-described rules.

Specifically, a variable that needs to be transferred from the CPU to the GPU is specified in a #pragma acc data copyin directive (see FIG. 7) and a variable that needs to be transferred from the GPU to the CPU is specified in a #pragma acc data copyout directive (see FIG. 8). When the same variable is to be specified in copyin and copyout directives, they are collectively described by a #pragma acc data copy directive for simplification.

The C/C++ code into which the parallel processing directives and the data transfer directives have been inserted is compiled by PGI compiler on the machine equipped with a GPU. The compiled executable file is deployed and subjected to the performance measurement by benchmark tools.

For each of all the individuals, after being subjected to the benchmark performance measurement, a degree of adaptability of the gene sequence is set according to its benchmark processing time. The individuals to be remained are selected according to the degrees of adaptability set to the individuals. The selected individuals are subjected to the GA processing of crossover, mutation, and as-is copy processes, to create a set of individuals of the next generation.

The next-generation individuals are then subjected to the processes of the directive insertion, compilation, performance measurement, setting of the degree of adaptability, selection, crossover, and mutation. If a gene having the same pattern as a pattern of an individual of an earlier generation is created in the GA process, compilation and performance measurement are not performed for that individual and the same measurement value as that of the pattern of the individual of the earlier generation is used.

After the GA process has been completed for a specified number of generations, the C/C++ code in which directives have been added and which corresponds to the gene sequence with the highest performance is selected as the solution.

In the above-described processes, the number of individuals, number of generations, crossover ratio, mutation ratio, setting of degree of adaptability, and selection method are parameters of GA and can be specified as appropriate. The proposed method makes it possible to automate GPU offloading, which conventionally requires time and skill of specialized engineers, by automating the above-described processes.

Figure 10A:
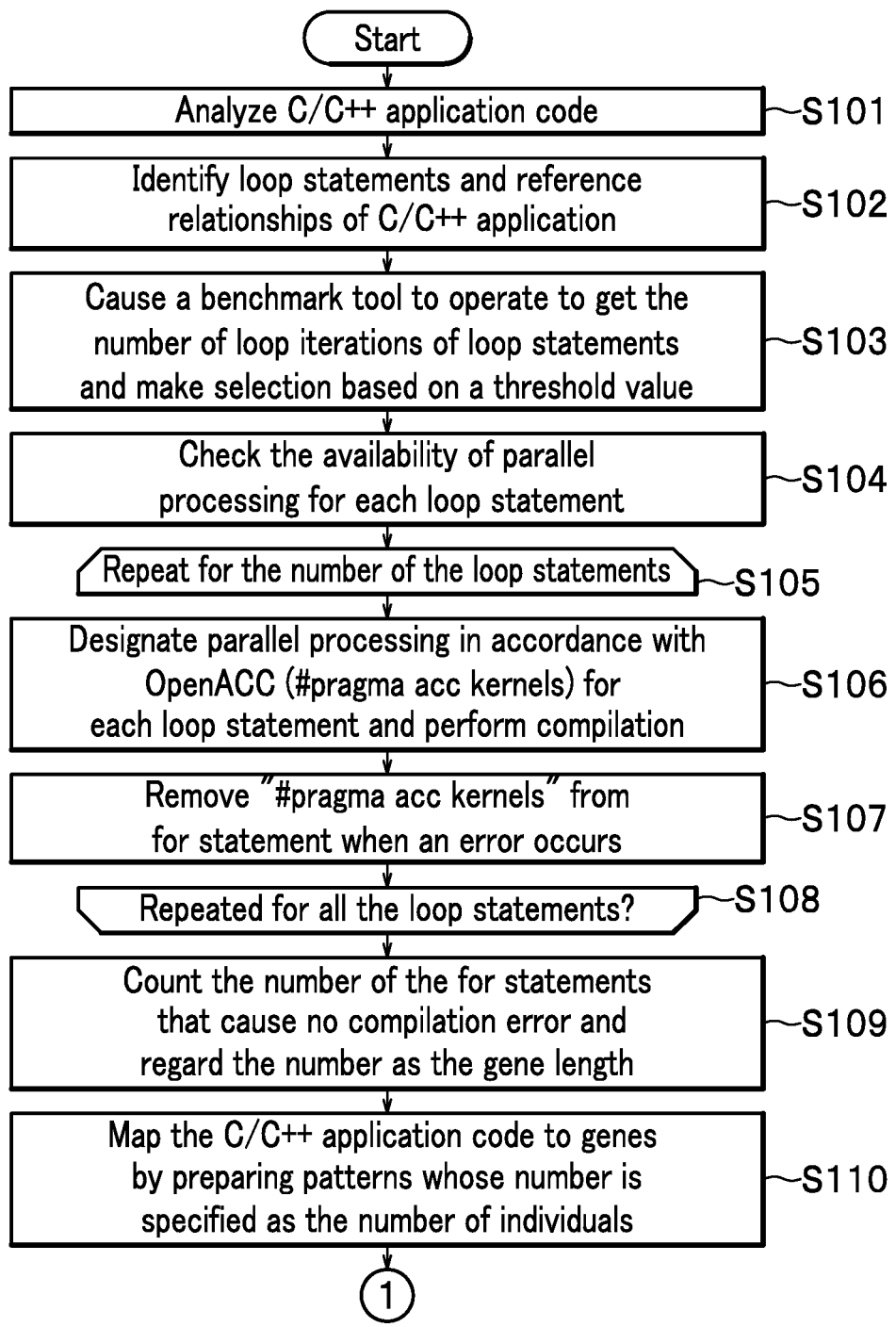
FIG. 10A is a flowchart schematically illustrating the operations of the offloading server according to the embodiment.
Figure 10B:
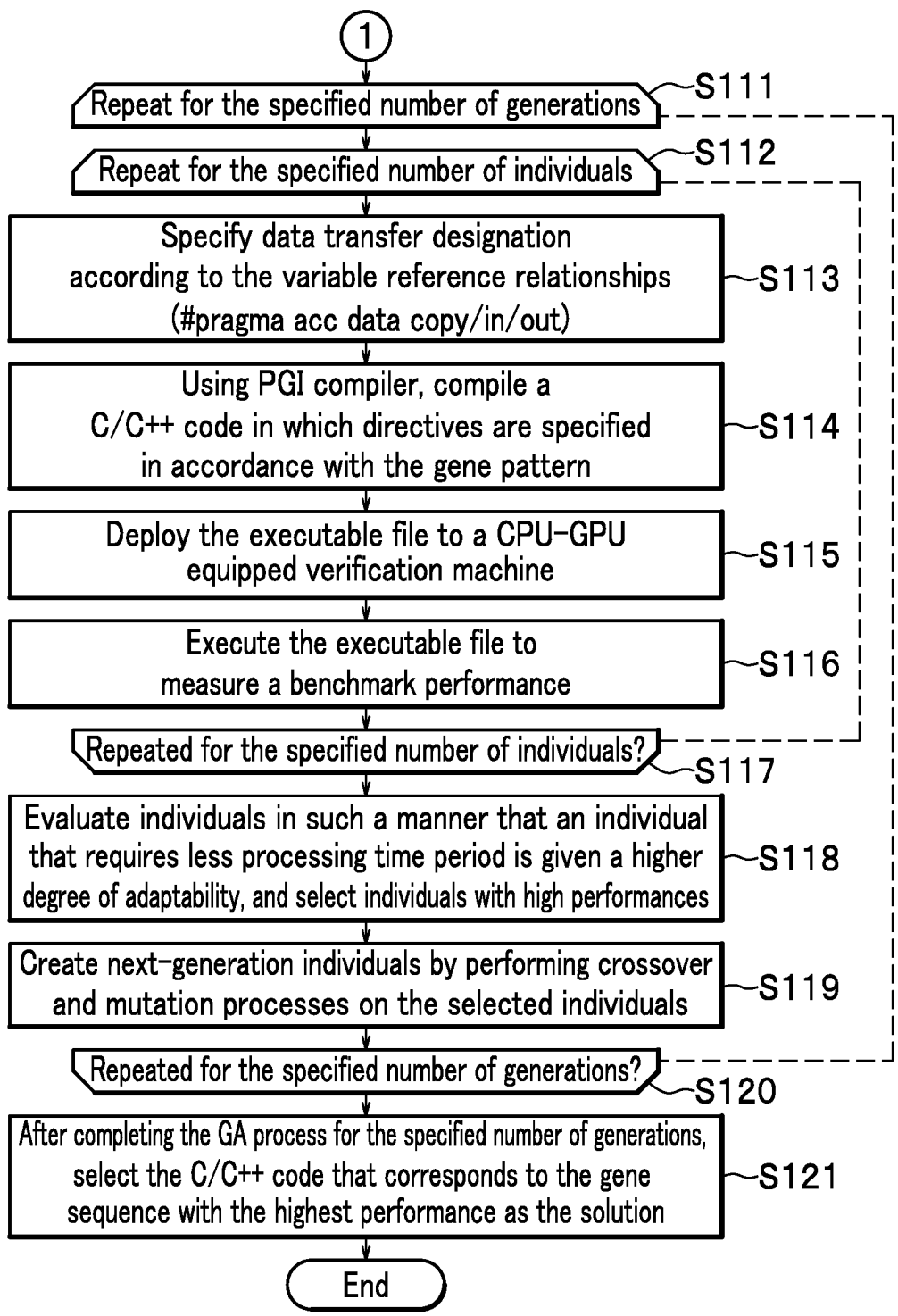
FIG. 10B is a flowchart schematically illustrating the operations of the offloading server according to the embodiment.

FIGS. 10A and 10B are flowcharts for explaining gist of operations of the above-described implementation. The flowcharts illustrated in FIG. 10A and FIG. 10B are connected via a connector.

The following processing is performed using an OpenACC compiler for C/C++.

<Code Analysis>

At step S101, the application code analysis section 112 (see FIG. 2) analyzes the code of the C/C++ application.

<Identification of Loop Statements>

At step S102, the parallel processing designation section 114 (see FIG. 2) identifies loop statements and reference relationships in the C/C++ application.

<Investigation on Iterations of Loop Statements>

At step S103, the parallel processing designation section 114 causes the benchmark tool to operate to get the number of loop iterations of loop statements and makes selection based on a threshold value.

<Availability of Parallel Processing of Loop Statements>

At step S104, the parallel processing designation section 114 checks the availability of parallel processing for each loop statement.

<Repeat of Loop Statements>

The control section (automatic offload function section) 11 repeats the processes of steps S106 to S107 between loop beginning step S105 and loop termination step S108, for the number of the loop statements.

At step S106, the parallel processing designation section 114 designates parallel processing in accordance with OpenACC (#pragma acc kernels) for each loop statement and perform compilation.

At step S107, the parallel processing designation section 114 removes "#pragma acc kernels" from the for statement when an error occurs.

At step S109, the parallel processing designation section 114 counts the number of the for statements that cause no compilation error and regards the number as the gene length.

<Preparation of Patterns Whose Number is Specified as the Number of Individuals>

Next, the parallel processing designation section 114 prepares, as initial values, gene sequences whose number is specified as the number of individuals. The initial values are created by randomly assigning values of 1 and 0.

At step S110, the parallel processing designation section 114 maps the C/C++ application code to genes by preparing patterns whose number is specified as the number of individuals.

According to each prepared gene sequence, the parallel processing designation section 114 inserts directives designating parallel processing into the C/C++ code at places corresponding to the gene elements assigned a value of 1 (for example, see the #pragma directive illustrated in FIG. 4).

The control section (automatic offload function section) 11 repeats the processes of steps S112 to S119 in between loop beginning step S111 and loop termination step S120, for the specified number of generations.

The control section 11 further repeats, in the above-described process to be repeated for the specified number of generations, the processes of steps S113 to S116 in between loop beginning step S112 and loop termination step S117, for the specified number of individuals. In other words, the repetitive process repeated for the specified number of individuals is processed in a nested manner in the repetitive process repeated for the specified number of generations.

<Designation of Data Transfer>

At step S113, the data transfer designation section 113 specifies data transfer designation using explicit directives (#pragma acc data copy/copyin/copyout) according to the variable reference relationships. The data transfer designation using explicit directives (#pragma acc data copy/copyin/copyout) has been described with reference to FIGS. 5 to 9.

<Compilation>

At step S114, the performance measurement section 116 (see FIG. 2) compiles, using PGI compiler, a C/C++ code in which directives are specified in accordance with the gene pattern. In detail, the performance measurement section 116 compiles the created C/C++ code with PGI compiler on the verification machine 14 equipped with a GPU.

Here, a compilation error could occur, for example, due to designation of plural for statements in parallel in nested for statements. Such a case is handled in the same manner as a case in which the processing time of performance measurement has timed out.

At step S115, the performance measurement section 116 (see FIG. 2) deploys the executable file to the CPU-GPU equipped verification machine 14.

At step S116, the performance measurement section 116 executes the deployed binary file to measure the benchmark performance of the offloading.

In an intermediate generation, if a gene has the same pattern as a pattern of an earlier generation, that gene of the intermediate generation is not measured, and the same value is used. In other words, if a gene having the same pattern as a pattern of an individual of an earlier generation is created in the GA process, compilation and performance measurement are not performed for that individual and the same measurement value as that of the pattern of the individual of the earlier generation is used.

At step S118, the performance measurement section 116 (see FIG. 2) evaluates individuals in such a manner that an individual that requires less processing time period is regarded as having a higher degree of adaptability, and selects individuals with high performances.

At step S119, the performance measurement section 116 creates next-generation individuals by performing crossover and mutation processes on the selected individuals. The next-generation individuals are then subjected to the processes of the compilation, performance measurement, evaluation of the degree of adaptability, selection, crossover, and mutation.

In other words, for each of all the individuals, after being subjected to the benchmark performance measurement, a degree of adaptability of the gene sequence is set according to its benchmark processing time. The individuals to be remained are selected according to the degrees of adaptability set to the individuals. The selected individuals are subjected to the GA processing of crossover, mutation, and as-is copy processes, to create a set of individuals of the next generation.

At step S121, the executable file creation section 117 selects, after completing the GA process for the specified number of generations, the C/C++ code that corresponds to the gene sequence with the highest performance (parallel processing pattern with the highest performance) as the solution.

<Parameters of GA>

The above-described number of individuals, number of generations, crossover ratio, mutation ratio, setting of degree of adaptability, and selection method are parameters of GA. The GA parameters may be set, for example, in the following manner.

The parameters and conditions of Simple GA to be performed can be set as follows:

Gene length: The number of loop statements that can be parallelized

Number of individuals M: A number equal to or less than the gene length

Number of generations T: A number equal to or less than the gene length

Degree of adaptability: (Processing time)$^{(-1/2)}$

With this settings, the shorter the processing time, the higher the degree of adaptability. Defining the degree of adaptability as the processing time raised to the minus one-half power prevents the search range from being narrow due to a certain individual having a too great value of degree of adaptability. When the performance measurement fails to finish in a certain period of time, the measurement is timed out and the degree of adaptability of the individual is calculated by regarding the individual as requiring a long processing time such as 1000 seconds (a long period of time). This timeout period may be modified according to the characteristics of the performance measurement.

Selection: Roulette Selection

Elite saving, in which the gene with the highest degree of adaptability in a generation is saved in the next generation without being subjected to crossover and mutation processes, is also performed.

Crossover ratio Pc:0.9

Mutation ratio Pm:0.05

<Cost Performance>

A description will be given of the cost performance of the automatic offloading.

Consulting the prices of the hardware of GPU boards such as NVIDIA Tesla, the price of a machine equipped with a GPU is about twice the price of a normal machine equipped with a CPU only. However, in general, the cost of hardware and system development is equal to or less than one-third of the cost of a data center or the like. The electricity bills and the operating cost of maintenance and operation systems are over one-third, and other costs such as service orders are about one-third. The present embodiment is capable of increasing the performance of time-consuming processing, e.g., cryptographic processing and/or image processing, of an application to be improved by a factor of two or more. Consequently, even when the price of the server hardware doubles, the cost effect can be fully expected.

According to the present embodiment, applications requiring a large execution time due to a large number of loop iterations are identified in advance using gcov and/or gprof or the like and the offloading is executed for trial. With this, applications that can be accelerated can be identified effectively.

<Time Until Starting Using the Real Service>

A description will be given of the time until starting using the real service.

Assuming that it takes about three minutes to perform one cycle of compilation to performance measurement, it takes about 20 hours at the maximum to find the solution in a case of a GA process processing 20 generations of 20 individuals. However, as compilation and measurement for a gene pattern that is the same as a gene pattern in an earlier generation are omitted, it will be finished in eight hours or less. In many cloud, hosting, and network services, it takes about half a day to start using the service. The present embodiment is capable of performing automatic offloading within half a day for example. Assuming that the automatic offloading is finished within half a day and that the user can use the service for trial at the beginning, it is expected that user satisfaction will be sufficiently improved.

It is conceivable to use a plurality of verification machines whose number is the number of the individuals to measure performance in parallel, in order to find the areas to be offloaded in a shorter period of time. Controlling the timeout period according to the application may also lead to the reduction of the time. For example, if the offloaded processing takes twice the time for the processing by CPU, the offloaded processing may be regarded as having timed out. In addition, the higher the number of individuals and the number of generations, the higher the possibility of finding a high-performance solution. However, setting these parameters to the maximum requires performing the compilation and performance benchmark testing for the number resulted in multiplying the number of individuals by the number of generations. It will take a longer time until starting the real service. In the case of the present embodiment, a relatively small numbers of individuals and generations are used compared to normal GA. However, by employing a high value of 0.9 as the crossover ratio Pc, it is possible to find a solution with a certain performance in an early time.

As described above, the offloading server 1 according to the present embodiment includes: the application code analysis section 112 configured to analyze the source code of an application; a data transfer designation section 113 configured to analyze reference relationships of variables used in loop statements and designate, for data that can be transferred outside a loop, a data transfer using an explicit directive that explicitly specifies a data transfer outside the loop, a parallel processing designation section 114 configured to identify loop statements in the application and, for each of the loop statements, specify a directive specifying application of parallel processing by the accelerator and perform compilation; and the parallel processing pattern creation section 115 configured to exclude loop statements causing a compilation error from loop statements to be offloaded and create a plurality of parallel processing patterns each of which specifies whether to perform parallel processing for each of the loop statements not causing a compilation error. The offloading server 1 further includes: the performance measurement section 116 configured to, for each of the plurality of processing patterns, compile the application according to the parallel processing pattern, deploy the compiled application to a verification machine 14, and perform processing for a measurement of a performance of the application when offloaded to the accelerator; and the executable file creation section 117 configured to select a parallel processing pattern with a highest processing performance as a solution from the plurality of parallel processing patterns on the basis of a result of the measurement of the performance, and compile the application according to the parallel processing pattern with the highest processing performance to create an executable file.

With this configuration, specific processing of the application is automatically offloaded to the accelerator while reducing the number of data transfers between the CPU and GPU. This leads to an increase in the overall processing capability. With this configuration, even a user not having the skill of using CUDA or the like can perform high performance processing using a GPU. In addition, it is possible to improve the performance of general-purpose, CPU-based applications for which performance improvement using a GPU has not been considered. In addition, offloading to a GPU of a general-purpose machine, which is not a high-performance server for calculation, is possible.

Moreover, an application (e.g., cryptographic processing and/or image processing) used for general purposes on IoT for users in Tacit Computing or the like can be offloaded to an accelerator in a certain period of time. With this, it is possible to reduce the number of servers, such as virtual machines, that drive a CPU, and, as a result, reduce the cost.

For example, as illustrated in FIG. 1, the offloading server 1 can take into account all the three layers (device layer, network layer, and cloud layer) and deploy the function to the most suitable layer and secure resources. With this, the offloading server 1 can provide the service desired by users continuously and reasonably.

According to the present embodiment, the data transfer designation section 113 is configured to analyze reference relationships of variables used in loop statements and designate, for data that can be transferred outside a loop, a data transfer using an explicit directive (#pragma acc data copyin/copyout/copy(a[ . . . ]), where a is a variable) that explicitly specifies a data transfer outside the loop, With this configuration, data transfer designations using explicit directives are performed in combination with the extraction of parallel processing using GA. This makes it possible to reduce the number of CPU-to-GPU data transfers and the number of GPU-to-CPU data transfers.

According to the present embodiment, the data transfer designation section 113 is configured to perform data transfer designations using an explicit directive (#pragma acc data copyin(a[ . . . ])) that explicitly specifies a CPU-to-GPU data transfer, an explicit directive (#pragma acc data copyout(a[ . . . ])) that explicitly specifies a GPU-to-CPU data transfer, and an explicit directive (#pragma acc data copy(a[ . . . ])) that explicitly specifies, when a CPU-to-GPU transfer and a GPU-to-CPU transfer are both to be performed on the same variable, those data copies in the both directions together.

With this configuration, data transfer is explicitly specified so as to be performed in a batch manner at a loop located as outer as possible, thereby to avoid ineffective data transfer such that data is transferred at every loop iteration.

According to the present embodiment, the data transfer designation section 113 is configured to, when a variable defined on the CPU program side is to be referenced by the GPU program side, specify a CPU-to-GPU data transfer immediately before the loop to be processed by the GPU or immediately before a loop which is the outermost loop in nested loops including the loop to be processed by the GPU and an outer loop(s) of the loop to be processed by the GPU and including neither setting nor definition of the variable. According to the present embodiment, the data transfer designation section 113 is configured to, when a variable set on the GPU program side is to be referenced by the CPU program side, specify a GPU-to-CPU data transfer immediately before the loop to be processed by the GPU or immediately before a loop which is the outermost loop in nested loops including the loop to be processed by the GPU and an outer loop(s) of the loop to be processed by the GPU and including neither reference, setting, nor definition of the variable except in the loop to be processed by the GPU.

With this configuration, when a CPU-to-GPU transfer and a GPU-to-CPU transfer are both to be performed on the same variable, they are collectively specified as data copies in the both directions, thereby to further effectively avoid ineffective data transfer such that data is transferred at every loop iteration.

The offloading server 1 according to the present embodiment includes the in-service environment deployment section 118 configured to deploy the created executable file to the in-service environment for users.

With this configuration, even a user not having the skill of using CUDA or the like can perform high performance processing using a GPU.

The offloading server 1 according to the present embodiment includes: the storage section 13 having the test case database 131 storing performance test items; and the performance measurement test extraction section 119 configured to, after the executable file has been deployed, extract performance test items from the test case database 131 and conduct a performance test.

With this configuration, performance testing of the automatic offloading may be carried out with the performance test items.

The parallel processing designation section 114 of the present embodiment includes: the offload area extraction section 114a configured to identify processing offloadable to an accelerator and extract an intermediate language according to the offload processing; and the intermediate language file output section 114b configured to output an intermediate language file 132. The performance measurement section 116 includes the binary file deployment section 116a configured to deploy an executable file derived from the intermediate language to the verification machine 14 and executes the deployed binary file to measure the performance of the binary file when offloaded and returns the result of the performance measurement to the offload area extraction section 114a. The offload area extraction section 114a is further configured to extract another parallel processing pattern. The intermediate language file output section 114b is further configured to carry out performance measurement for trial using an extracted intermediate language. The executable file creation section 117 is configured to select a parallel processing pattern with a highest processing performance from the plurality of parallel processing patterns created by the parallel processing pattern creation section 115 and the another parallel processing pattern extracted by the offload area extraction section 114a, on the basis of the result of the performance measurement repeated for a predetermined number of times and compile the application according to the parallel processing pattern with the highest processing performance to create the executable file.

With this configuration, an intermediate language according to the offloading processing is extracted and an intermediate language file is outputted. Then, the executable file derived from the intermediate language is deployed. In addition, extraction of the intermediate language and deployment of the executable file are repeated to find appropriate offload areas. With this, it is possible to automatically extract appropriate offload areas from a general-purpose program that does not assume parallelization.

According to the present embodiment, the executable file creation section 117 repeats a performance measurement on the verification machine 14 while the application is actually being used, selects the parallel processing pattern with the highest processing performance, compiles the application according to the parallel processing pattern with the highest processing performance to create the executable file, and deploys the executable file to an actual use environment at a predetermined timing.

With this configuration, it is possible to deploy and provide the executable file with the highest processing performance as the service, to the in-service environment which is actually provided to the user. Therefore, it is possible to improve the user satisfaction.

According to the present embodiment, the parallel processing designation section 114 is configured to regard, in accordance with a genetic algorithm, a number of the repeat statements not causing a compilation error as a gene length; the parallel processing pattern creation section 115 is configured to prepare gene patterns for current-generation individuals whose number is specified, wherein each of the gene patterns has elements whose value is randomly assigned a value of 1 or 0 and application/non-application of accelerator processing is mapped to the value in such a way that performing accelerator processing is assigned either 1 or 0 and not performing acceleration processing is assigned either the opposite 0 or 1; the performance measurement section 116 is configured to perform a performance measurement process including: for each of the current-generation individuals, compiling an application code in which directives specifying application of parallel processing by the accelerator are described, deploying the compiled code to the verification machine 14, and performing processing for the measurement of the performance of the individual on the verification machine 14; the performance measurement section 116 is configured to perform a recombination process including: after the measurement of the performance has been completed for all the current-generation individuals, evaluating the current-generation individuals in such a manner that an individual that requires less processing time period is regarded as having a higher degree of adaptability, selecting one or more individuals each having a degree of adaptability higher than a predetermined value from all the individuals as individuals with high performances, and creating a specified number of next-generation individuals by performing crossover and mutation processes on the selected one or more individuals; the performance measurement section 116 is configured to repeat the recombination process and the performance measurement process for a specified number of generations using the next-generation individuals as the current-generation individuals; and the executable file creation section 117 is configured to, after the recombination process and the performance measurement process have been completed for the specified number of generations, select a parallel processing pattern corresponding to an individual with a highest performance as the solution.

With this configuration, the embodiment first checks if for statements can be parallelized and then, for a set of for statements that can be parallelized, repeatedly performs a performance verification trial on a verification environment using GA to find appropriate areas. By narrowing down to the for statements that can be parallelized and holding and recombining parallel processing patterns that may possibly achieve acceleration in a form of a part of gene, a pattern that achieves acceleration can be efficiently found from an enormous number of parallel processing patterns that can be made.

According to the present embodiment, when an individual of an intermediate generation has a gene representing a parallel processing pattern which is same as the gene of an individual of an earlier generation, the performance measurement section 116 does not perform compilation of the application code with the same processing pattern and does not perform performance measurement and uses the same performance measurement value as that of the individual of the earlier generation.

With this configuration, as compilation and measurement for a gene pattern having the same pattern with one having been measured are omitted, it is possible to reduce the time for processing.

According to the present embodiment, the performance measurement section 116 regards an application code causing a compilation error and an application code with which the performance measurement does not finish within a predetermined time period as causing a timeout and sets a performance measurement value to a predetermined period of time (a long period of time).

With this configuration, while keeping the offloadable for statement as far as possible, the processing time can be reduced by adjusting the timeout period.

It should be noted that, of the processes described in the description of the above-described embodiment, a part or the whole of a process described as being automatically performed may be carried out manually, and a part or the whole of a process described as being manually performed may be automatically carried out using known procedure. As to the information including the processing procedures, control procedures, specific names, various data and parameters, which are described in the specification or illustrated in the drawings can be changed unless otherwise stated.

The constituent elements of the devices illustrated in the drawings each represent a conceptual functional element and are not necessarily required to be physically structured as illustrated. That is, concrete modes of the distribution and integration of the devices are not limited to those illustrated in the drawings. Some or all of the devices can be distributed or integrated in terms of functional and physical allocation in a freely selected unit, according to the load and use state of the devices.

Further, some or all of the above-described components, functions, processing units and processing means may be realized through hardware by designing them, for instance, on an integrated circuit. Moreover, the above components or functions might also be realized through software that causes a processor to interpret and execute programs realizing respective functions. Information such as programs, tables or files realizing the functions can be stored in storage devices such as memories, hard disks, or solid state drives (SSDs) or in recording media such as integrated circuit (IC) cards, secure digital (SD) cards, or optical disks.

The present embodiment uses a method of genetic algorithm (GA) to find a solution of a combinatorial optimization problem in a limited period of time for optimization. However, the optimization method can be any method. For example, a local search method, a dynamic programming method, or a combination of them can be used.

Moreover, although the present embodiment uses Open-ACC compiler for C/C++, any compiler that can offload processing to a GPU can be used. For example, Java lambda (registered trademark) GPU processing of IBM Java 9 SDK (registered trademark) can be used. It should be noted that the parallel processing directives depend on these development environments.

For example, Java (registered trademark) 8 or later allows description of parallel processing in the lambda format. IBM (registered trademark) provides a JIT compiler that converts parallel processing descriptions in the lambda format to GPU offloading. When using Java, using these, performing GA to tune as to whether to convert loop processing into lambda format makes it possible to perform the same offloading.

In the description of the present embodiment, for statements are exemplified as repeat statements (loop statements). However, the repeat statements include while statements and do-while statements other than for statements. However, for statements, which specifies the continuation conditions or the like, are more suitable.

REFERENCE SIGNS LIST 1 offloading server
11 control section
12 input/output section
13 storage section
14 verification machine (accelerator verification machine)
15 OpenIoT resource
111 application code designation section
112 application code analysis section
113 data transfer designation section
114 parallel processing designation section
114a offload area extraction section
114b intermediate language file output section
115 parallel processing pattern creation section
116 performance measurement section
116a binary file deployment section
117 executable file creation section
118 in-service environment deployment section
119 performance measurement test extraction section
120 user presentation section
130 application code
131 test case database
132 intermediate language file
151 device
152 device with CPU-GPU
153 device with CPU-FPGA
154 device with CPU

The invention claimed is:

1. An offloading server implemented using a computer system having one or more hardware processors, the offloading server configured to offload specific processing of an application to an accelerator, the offloading server comprising:
an application code analysis section, implemented using one or more of the one or more hardware processors, configured to analyze a source code of the application;
a data transfer designation section, implemented using one or more of the one or more hardware processors, configured to analyze reference relationships of variables used in loop statements in the application and to make, for data that can be transferred outside a loop, data transfer designation using an explicit directive that explicitly specifies a data transfer outside the loop;
a parallel processing designation section, implemented using one or more of the one or more hardware processors, configured to identify the loop statements in the application and, for each of the loop statements, specify a directive specifying application of parallel processing by the accelerator and perform compilation;
a parallel processing pattern creation section, implemented using one or more of the one or more hardware processors, configured to identify a first set of loop statements, of the loop statements in the application, that cause a compilation error as a result of the compilation and identify a second set of loop statements, of the loop statements in the application, that do not cause the compilation error as the result of the compilation, configured to exclude the first set of loop statements from being offloaded, and configured to create a plurality of parallel processing patterns each of which specifies whether to perform parallel processing for each of the second set of loop statements;
a performance measurement section, implemented using one or more of the one or more hardware processors, configured to, for each of the plurality of parallel processing patterns, compile the application according to the parallel processing pattern, deploy the compiled application to an accelerator verification machine, and perform processing for a measurement of a performance of the application when offloaded to the accelerator; and
an executable file creation section, implemented using one or more of the one or more hardware processors, configured to select a parallel processing pattern with a highest processing performance as a solution from the plurality of parallel processing patterns on basis of a result of the measurement of the performance, and compile the application according to the parallel processing pattern with the highest processing performance to create an executable file.

2. The offloading server according to claim 1,
wherein the data transfer designation section is further configured to perform data transfer designations using: an explicit directive that explicitly specifies a CPU-to-accelerator data transfer, and an explicit directive that explicitly specifies an accelerator-to-CPU data transfer.

3. The offloading server according to claim 1,
wherein the data transfer designation section is further configured to, when a first variable defined on a CPU program side is to be referenced by an accelerator program side, specify a CPU-to-accelerator data transfer immediately before a first loop to be processed by the accelerator or immediately before a loop which is the outermost loop of nested loops including the first loop and an outer loop of the first loop and including neither setting nor definition of the first variable, and
wherein the data transfer designation section is further configured to, when a second variable set on the accelerator program side is to be referenced by the CPU program side, specify an accelerator-to-CPU data transfer immediately before a second loop to be processed by the accelerator or immediately before a loop which is the outermost loop of nested loops including the second loop and an outer loop of the second loop and including neither reference, setting, nor definition of the second variable except in the second loop.

4. The offloading server according to claim 3,
wherein the data transfer designation section is further configured to, when a CPU-to-accelerator data transfer and an accelerator-to-CPU data transfer are both to be performed on the same variable, specify a data transfer using an explicit directive that explicitly specifies data transfers in the both directions.

5. The offloading server according to claim 1, further comprising:
a storage section having a test case database storing performance test items; and
a performance measurement test extraction section, implemented using one or more of the one or more hardware processors, configured to, after the executable file has been deployed to an in-service environment, extract performance test items from the test case database and conduct a performance test.

6. The offloading server according to claim 1,
wherein the parallel processing designation section comprises:
an offload area extraction section, implemented using one or more of the one or more hardware processors, configured to identify processing offloadable to the accelerator and extract an intermediate language according to offload processing; and
an intermediate language file output section, implemented using one or more of the one or more hardware processors, configured to output an intermediate language file,
wherein the performance measurement section is further configured to: deploy an executable file derived from an intermediate language to the accelerator verification machine, cause the accelerator verification machine to execute the deployed binary file and to perform a measurement of a performance of the deployed binary file when offloaded, and acquire a result of the measurement of the performance of the deployed binary file and return the result to the offload area extraction section,
wherein the offload area extraction section is further configured to extract another parallel processing pattern,
wherein the intermediate language file output section is further configured to carry out a performance measurement for trial using an extracted intermediate language, and
wherein the executable file creation section is further configured to select a parallel processing pattern with a highest processing performance from the plurality of parallel processing patterns created by the parallel processing pattern creation section and the another parallel processing pattern extracted by the offload area extraction section, on basis of the result of the performance measurement repeated for a predetermined number of times and compile the application according to the parallel processing pattern with the highest processing performance to create the executable file.

7. The offloading server according to claim 1,
wherein the parallel processing designation section is further configured to regard, in accordance with a genetic algorithm, a number of the second set of loop statements as a gene length,
wherein the parallel processing pattern creation section is further configured to prepare gene patterns for current-generation individuals whose number is specified, wherein each of the gene patterns has elements whose value is randomly assigned a value of 1 or 0 and application/non-application of accelerator processing is mapped to the value in such a way that performing accelerator processing is assigned either 1 or 0 and not performing acceleration processing is assigned either the opposite 0 or 1,
wherein the performance measurement section is further configured to perform a performance measurement process comprising: for each of the current-generation individuals, compiling an application code in which directives specifying application of parallel processing by the accelerator are described, deploying the compiled code to the accelerator verification machine, and performing processing for the measurement of the performance of the individual on the accelerator verification machine,
wherein the performance measurement section is further configured to perform a recombination process comprising: after the measurement of the performance has been completed for all the current-generation individuals, evaluating the current-generation individuals in such a manner that an individual that requires less processing time period is regarded as having a higher degree of adaptability, selecting one or more individuals each having a degree of adaptability higher than a predetermined value from all the individuals as individuals with high performances, and creating a specified number of next-generation individuals by performing crossover and mutation processes on the selected one or more individuals,
wherein the performance measurement section is further configured to repeat the recombination process and the performance measurement process for a specified number of generations using the next-generation individuals as the current-generation individuals, and
wherein the executable file creation section is further configured to, after the recombination process and the performance measurement process have been completed for the specified number of generations, select a parallel processing pattern corresponding to an individual with a highest performance as the solution.

8. A non-transitory computer-readable medium storing an offloading program configured to cause a computer having one or more hardware processors to function as an offloading server configured to offload specific processing of an application to an accelerator, the offloading server comprising:
an application code analysis section, implemented using one or more of the one or more hardware processors, configured to analyze a source code of the application;
a data transfer designation section, implemented using one or more of the one or more hardware processors, configured to analyze reference relationships of variables used in loop statements in the application and to make, for data that can be transferred outside a loop, data transfer designation using an explicit directive that explicitly specifies a data transfer outside the loop;
a parallel processing designation section, implemented using one or more of the one or more hardware processors, configured to identify the loop statements in the application and, for each of the loop statements, specify a directive specifying application of parallel processing by the accelerator and perform compilation;
a parallel processing pattern creation section, implemented using one or more of the one or more hardware processors, configured to identify a first set of loop statements, of the loop statements in the application, that cause a compilation error as a result of the compilation and identify a second set of loop statements, of the loop statements in the application, that do not cause the compilation error as the result of the compilation, configured to exclude the first set of loop statements from being offloaded, and configured to create a plurality of parallel processing patterns each of which specifies whether to perform parallel processing for each of the second set of loop statements;
a performance measurement section, implemented using one or more of the one or more hardware processors, configured to, for each of the plurality of parallel processing patterns, compile the application according to the parallel processing pattern, deploy the compiled application to an accelerator verification machine, and perform processing for a measurement of a performance of the application when offloaded to the accelerator; and an executable file creation section, implemented using one or more of the one or more hardware processors, configured to select a parallel processing pattern with a highest processing performance as a solution from the plurality of the parallel processing patterns on basis of a result of the measurement of the performance, and compile the application according to the parallel processing pattern with the highest processing performance to create an executable file.

* * * * *